US012803598B2

(12) United States Patent
Nam et al.

(10) Patent No.: US 12,803,598 B2
(45) Date of Patent: Nov. 17, 2026

(54) ELECTRONIC DEVICE FOR PROVIDING SECURE CONNECTION AND OPERATING METHOD THEREOF

(71) Applicant: Samsung Electronics Co., Ltd., Suwon-si (KR)

(72) Inventors: Janghyun Nam, Suwon-si (KR); Kyuhyuck Kwak, Suwon-si (KR); Hyoseok Na, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 383 days.

(21) Appl. No.: 18/490,651

(22) Filed: Oct. 19, 2023

(65) Prior Publication Data

US 2024/0137050 A1 Apr. 25, 2024
US 2024/0235583 A9 Jul. 11, 2024

Related U.S. Application Data

(63) Continuation of application No. PCT/KR2023/016196, filed on Oct. 18, 2023.

(30) Foreign Application Priority Data

Oct. 19, 2022 (KR) ........................ 10-2022-0134932
Dec. 6, 2022 (KR) ........................ 10-2022-0168993

(51) Int. Cl.
*H04B 1/04* (2006.01)
*H04W 76/10* (2018.01)
*H04W 76/30* (2018.01)

(52) U.S. Cl.
CPC .............. *H04B 1/04* (2013.01); *H04W 76/10* (2018.02); *H04W 76/30* (2018.02); *H04B 2001/0408* (2013.01)

(58) Field of Classification Search
CPC .... H04B 1/40; H04B 1/04; H04B 2001/0408; H04B 1/16; H04B 76/10; H04B 76/30
See application file for complete search history.

(56) References Cited

U.S. PATENT DOCUMENTS 10,397,764 B2 * 8/2019 Park ........................ H04W 4/80
10,608,706 B2 * 3/2020 Na ........................ H04B 7/0404
(Continued)

FOREIGN PATENT DOCUMENTS

KR 10-2018-0081289 A 7/2018
KR 10-2019-0057678 A 5/2019
(Continued)

OTHER PUBLICATIONS

International Search Report & Written Opinion for PCT/KR2023/016196 by Korean Intellectual Property Office dated Jan. 22, 2024.

*Primary Examiner* — Tuan H Nguyen
(74) *Attorney, Agent, or Firm* — NIXON & VANDERHYE P.C.

(57) ABSTRACT

An electronic device may include at least one antenna, at least one RF circuit including at least one RFIC, at least one PA, and at least one divider, a connection part, and at least one processor operatively connected to the connection part and the at least one RF circuit. The at least one processor may be configured to turn off the at least one PA based on a connection between the electronic device and an external electronic device (102; 200), convert, via the at least one RFIC, data for transmission to the external electronic device into an RF signal, and direct the RF signal to the connection part via the at least one divider, the RF signal being directed to the external electronic device via the connection part.

15 Claims, 10 Drawing Sheets

(56) References Cited

U.S. PATENT DOCUMENTS

| | | | |
|---|---|---|---|
| 11,848,898 B2 * | 12/2023 | Hormis | H04W 72/23 |
| 2006/0030265 A1 | 2/2006 | Desai et al. | |
| 2009/0262669 A1 | 10/2009 | Sanders | |
| 2015/0105121 A1 | 4/2015 | Emmanuel et al. | |
| 2018/0199148 A1 | 7/2018 | Park et al. | |
| 2019/0158154 A1 | 5/2019 | Na | |
| 2020/0221545 A1 | 7/2020 | Stacey et al. | |
| 2021/0305739 A1 | 9/2021 | Ghim et al. | |
| 2021/0336356 A1 | 10/2021 | Choi et al. | |
| 2021/0376896 A1 | 12/2021 | Zhang et al. | |
| 2024/0007596 A1 | 1/2024 | Song et al. | |

FOREIGN PATENT DOCUMENTS

| | | | |
|---|---|---|---|
| KR | 10-2020-0012679 | A | 2/2020 |
| KR | 10-2385522 | B1 | 4/2022 |
| KR | 10-2402641 | B1 | 5/2022 |
| KR | 10-2023-0171349 | A | 12/2023 |
| WO | 2020/162645 | A1 | 8/2020 |
| WO | 2021/145464 | A1 | 7/2021 |
| WO | 2021/215557 | A1 | 10/2021 |

* cited by examiner

ELECTRONIC DEVICE FOR PROVIDING SECURE CONNECTION AND OPERATING METHOD THEREOF

CROSS REFERENCE TO RELATED APPLICATIONS

This application is a continuation application of International Application No. PCT/KR2023/016196, filed on Oct. 18, 2023, which claims priority from and derives the benefit of Korean Patent Application No. 10-2022-0134932, filed on Oct. 19, 2022, and further claims priority from and derives the benefit of Korean Patent Application No. 10-2022-0168993, filed on Dec. 6, 2022, the entire contents of each of these applications is hereby incorporated in their entirety, by reference.

TECHNICAL FIELD

This disclosure relates generally to electronic devices, for example, electronic devices providing a secure connection and operating methods thereof.

BACKGROUND

With the recent development of an information communication technology, various wireless communication technologies and various services have been developed. In particular, a Bluetooth scheme, for example, a Bluetooth low energy (BLE) scheme, which is one of short-range communication schemes, has been actively used, and in the BLE scheme, low-capacity data may be transmitted and/or received with low power in a 2.4 GHz band. Electronic devices using the BLE scheme may operate in an active mode during time when a connection operation, a data transmission operation, and/or a data reception operation between the electronic devices are performed, and may operate in a sleep mode during other times. So, power consumption of the electronic devices using the BLE scheme may be reduced compared to a case that a legacy Bluetooth scheme is used. Accordingly, the BLE scheme may be mainly used in electronic devices for which power supply is limited, such as a health care device, a sensor device, or a wearable device (e.g., earphones, smart watches, or smart glasses).

Further, in addition to the Bluetooth scheme, a wireless fidelity (Wi-Fi) scheme enabling a high-performance wireless communication based on a wireless local communication network (a wireless local access network (LAN)) has also been actively used. The Wi-Fi scheme may be a short-range communication scheme based on institute of electrical and electronics engineers (IEEE) 802.11, and use a 2.4 GHz band and a 5 GHz band.

Further, a 4th generation (4G) mobile communication system may support various bands, and a B31 band among the various bands may be a 450 MHz band, and may be used for a communication for which a relatively high security level (e.g., a security level greater than or equal to a threshold security level) is required. An external electronic device supporting the B31 band may be generally implemented in a dongle form, and the external electronic device implemented in the dongle form may be used by being wirelessly coupled to an electronic device (e.g., a smart phone).

A communication between the external electronic device and the electronic device may be a communication based on a Bluetooth scheme and/or a Wi-Fi scheme. The external electronic device and the electronic device may each transmit and receive a signal of the B31 band (e.g., a signal whose security level is higher than or equal to the threshold security level) via an antenna. For the connection between the electronic device and the external electronic device, a user may execute an application capable of using the external electronic device in the electronic device to set up a connection between the electronic device and the external electronic device which is based on the Bluetooth scheme and/or the Wi-Fi scheme. The electronic device and the external electronic device may perform a communication based on the set-up connection.

If the electronic device transmits the signal of the B31 band whose security level is higher than or equal to the threshold security level to the external electronic device, even though the security level of the B31 band signal itself is higher than or equal to the threshold level, when the electronic device and the external electronic device perform a communication through a connection which is based on the Bluetooth scheme and/or the Wi-Fi scheme, security may be vulnerable due to antenna radiation. The communication in a form of the antenna radiation may have a vulnerability of the security such as an attack by a hacker, so it may not be suitable for transmission and reception of a signal for which security is important.

DETAILED DESCRIPTION

According to an embodiment of the disclosure, an electronic device may include at least one antenna, at least one radio frequency (RF) circuit including at least one radio frequency integrated circuit (RFIC), at least one power amplifier (PA) connected to the at least one antenna, and at least one divider connected to the at least one RFIC and the at least one PA, a connection part connected to the at least one divider, and at least one processor operatively connected to the connection part and the at least one RF circuit.

According to an embodiment of the disclosure, the at least one processor may be configured to turn off the at least one PA based on a connection between the electronic device and an external electronic device.

According to an embodiment of the disclosure, the at least one processor may be further configured to convert, via the at least one RFIC, data for transmission to the external electronic device into an RF signal.

According to an embodiment of the disclosure, the at least one processor may be further configured to direct the RF signal to the connection part via the at least one divider, and the RF signal may be directed to the external electronic device via the connection part.

According to an embodiment of the disclosure, an electronic device may include a connection part, at least one radio frequency (RF) circuit for converting a baseband signal into an RF signal, and at least one processor operatively connected to the connection part and the at least one RF circuit.

According to an embodiment of the disclosure, the at least one processor may be configured to receive, via the connection part, a signal from an external electronic device based on a connection between the external electronic device and the electronic device.

According to an embodiment of the disclosure, the signal received from the external electronic device may be received via another connection part connected to at least one divider included in at least one RF circuit of the external electronic device.

According to an embodiment of the disclosure, the operating method may include turning off at least one power amplifier (PA) which is included in at least one radio frequency (RF) circuit and connected to at least one antenna based on a connection between an external electronic device and the electronic device.

According to an embodiment of the disclosure, the operating method may further include converting, via at least one radio frequency integrated circuit (RFIC) included in the at least one RF circuit, data to be transmitted to the external electronic device into an RF signal, and directing, via at least one divider connected to the at least one PA, the RF signal into a connection part connected to the at least one divider to direct the RF signal to the external electronic device.

According to an embodiment of the disclosure, an operating method of an electronic device may include receiving, via a connection part connected to at least one radio frequency (RF) circuit, a signal from an external electronic device based on a connection between the external electronic device and the electronic device.

According to an embodiment of the disclosure, the signal received from the external electronic device may be received via another connection part connected to at least one divider included in at least one RF circuit of the external electronic device.

According to an embodiment, a non-transitory computer readable storage medium may include one or more programs, the one or more programs comprising instructions configured to, when executed by at least one processor of an electronic device, cause the electronic device to turn off at least one power amplifier (PA) which is included in at least one radio frequency (RF) circuit and connected to at least one antenna based on a connection between an external electronic device and the electronic device.

According to an embodiment, the instructions may be further configured to cause the electronic device to convert, via at least one radio frequency integrated circuit (RFIC) included in the at least one RF circuit, data for transmission to the external electronic device into an RF signal, and direct, via at least one divider connected to the at least one PA, the RF signal to a connection part connected to the at least one divider, the RF signal being directed to the external electronic device via the connection part.

According to an embodiment, a non-transitory computer readable storage medium may include one or more programs, the one or more programs comprising instructions configured to, when executed by at least one processor of an electronic device, cause the electronic device to receive, via a connection part connected to at least one radio frequency (RF) circuit, a signal from an external electronic device based a connection between the external electronic device and the electronic device.

According to an embodiment, the signal received from the external electronic device may be received via another connection part connected to at least one divider included in at least one RF circuit of the external electronic device.

Figure 1:
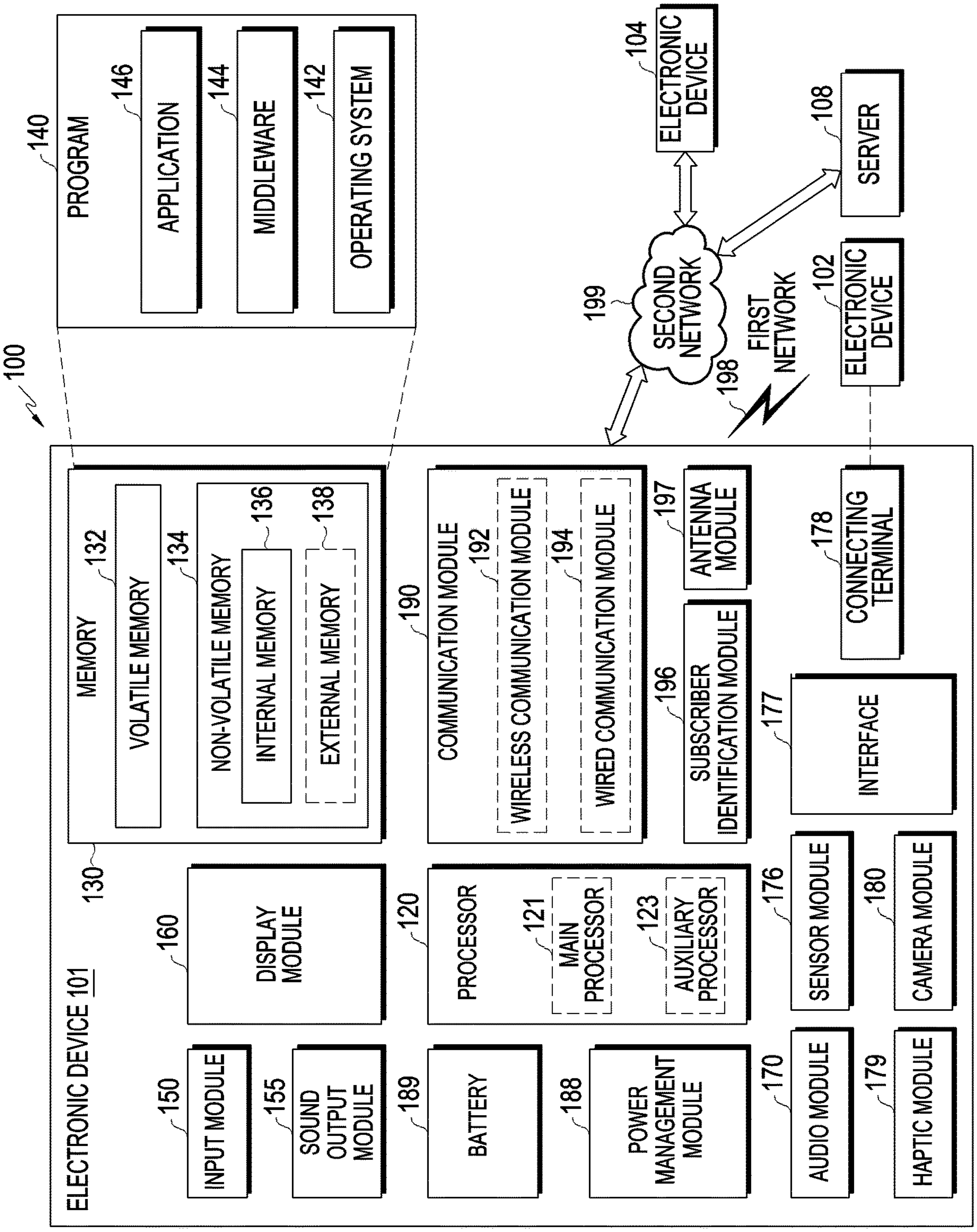
FIG. 1 is a block diagram illustrating an electronic device in a network environment according to an embodiment.

Hereinafter, embodiments of the disclosure will be described in detail with reference to the accompanying drawings. In the following description of an embodiment of the disclosure, a detailed description of relevant known functions or configurations incorporated herein will be omitted when it is determined that the description may make the subject matter of an embodiment of the disclosure less clear. The terms which will be described below are terms defined in consideration of the functions in the disclosure, and may be different according to users, intentions of the users, or customs. Therefore, the definitions of the terms should be made based on the contents throughout the specification.

It should be noted that the technical terms used herein are only used to describe specific embodiments, and are not intended to limit any embodiment of the disclosure. Alternatively, the technical terms used herein should be interpreted to have the same meaning as those commonly understood by a person skilled in the art to which the disclosure pertains, and should not be interpreted to have excessively comprehensive or excessively restricted meanings unless particularly defined as other meanings. Alternatively, when the technical terms used herein are wrong technical terms that cannot correctly represent the idea of the disclosure, it should be appreciated that they are replaced by technical terms correctly understood by those skilled in the art. Alternatively, the general terms used in an embodiment of the disclosure should be interpreted as defined in dictionaries or interpreted in the context of the relevant part, and should not be interpreted to have excessively restricted meanings.

Alternatively, a singular expression used herein may include a plural expression unless they are definitely different in the context. As used herein, such an expression as "comprises" or "include", or the like should not be interpreted to necessarily include all elements or all operations described in the specification, and should be interpreted to be allowed to exclude some of them or further include additional elements or operations.

Alternatively, the terms including an ordinal number, such as expressions "a first" and "a second" may be used to describe various elements, but the corresponding elements should not be limited by such terms. These terms are used merely to distinguish between one element and any other element. For example, a first element may be termed a second element, and similarly, a second element may be termed a first element without departing from the scope of the disclosure.

It should be understood that when an element is referred to as being "connected" or "coupled" to another element, it may be connected or coupled directly to the other element, or any other element may be interposer between them. In contrast, it should be understood that when an element is referred to as being "directly connected" or "directly coupled" to another element, there are no element interposed between them.

Hereinafter, an embodiment of the disclosure will be described in detail with reference to the accompanying drawings. Regardless of drawing signs, the same or like elements are provided with the same reference numeral, and a repeated description thereof will be omitted. Alternatively, in describing an embodiment of the disclosure, a detailed description of relevant known technologies will be omitted when it is determined that the description may make the subject matter of the disclosure unclear. Alternatively, it should be noted that the accompanying drawings are presented merely to help easy understanding of the technical idea of the disclosure, and should not be construed to limit the technical idea of the disclosure. The technical idea of the disclosure should be construed to cover all changes, equivalents, and alternatives, in addition to the drawings.

Hereinafter, an electronic device will be described in an embodiment of the disclosure, but the electronic device may be referred to as a terminal, a mobile station, a mobile equipment (ME), a user equipment (UE), a user terminal (UT), a subscriber station (SS), a wireless device, a handheld device, or an access terminal (AT). Alternatively, in an embodiment of the disclosure, the electronic device may be a device having a communication function such as, for example, a mobile phone, a personal digital assistant (PDA), a smart phone, a wireless MODEM, or a notebook.

FIG. 1 is a block diagram illustrating an electronic device 101 in a network environment 100 according to an embodiment.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence model is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to an embodiment, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to an embodiment may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that an embodiment of the disclosure and the terms used therein are not intended to limit the technological features set forth herein to a particular embodiment and include various changes, equivalents, or replacements for an embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as “A or B,” “at least one of A and B,” “at least one of A or B,” “A, B, or C,” “at least one of A, B, and C,” and “at least one of A, B, or C,” may include any one of, or all possible combinations of the items enumerated together in a corresponding one of the phrases. As used herein, such terms as “1st” and “2nd,” or “first” and “second” may be used to simply distinguish a corresponding component from another, and does not limit the components in other aspect (e.g., importance or order). It is to be understood that if an element (e.g., a first element) is referred to, with or without the term “operatively” or “communicatively”, as “coupled with,” “coupled to,” “connected with,” or “connected to” another element (e.g., a second element), it means that the element may be coupled with the other element directly (e.g., wiredly), wirelessly, or via a third element.

As used in connection with an embodiment of the disclosure, the term “module” may include a unit implemented in hardware, software, or firmware, and may interchangeably be used with other terms, for example, “logic,” “logic block,” “part,” or “circuitry”. A module may be a single integral component, or a minimum unit or part thereof, adapted to perform one or two or more functions. For example, according to an embodiment, the module may be implemented in a form of an application-specific integrated circuit (ASIC).

An embodiment as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term “non-transitory” simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to an embodiment, each component (e.g., a module or a program) of the above-described components may include a single entity or multiple entities, and some of the multiple entities may be separately disposed in different components. According to an embodiment, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to an embodiment, operations performed by the module, the program, or another component may be carried out sequentially, in parallel, repeatedly, or heuristically, or one or more of the operations may be executed in a different order or omitted, or one or more other operations may be added.

Figure 2:
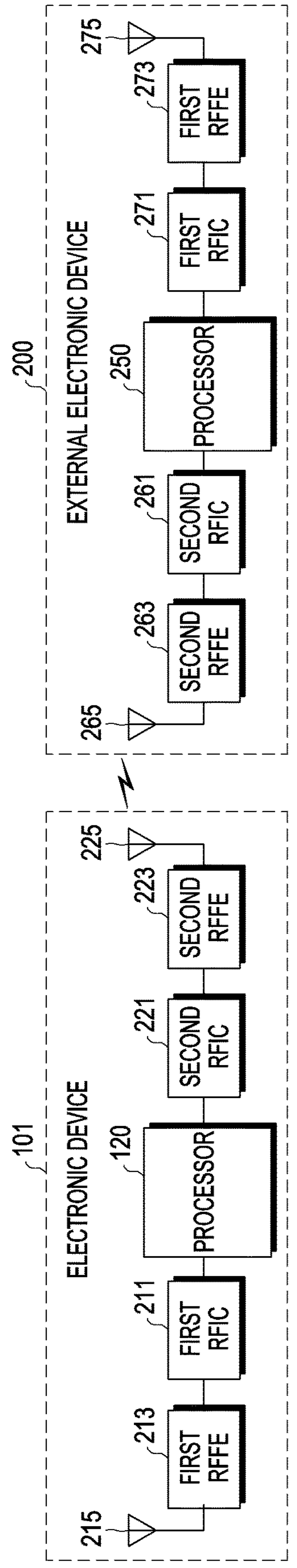
FIG. 2 is a diagram for describing a security issue due to antenna radiation between an electronic device and an external electronic device.

FIG. 2 is a diagram for describing a security issue due to antenna radiation between an electronic device and an external electronic device.

Referring to FIG. 2, an electronic device 101 (e.g., an electronic device 101 in FIG. 1) (e.g., a smart phone) may include a processor 120 (e.g., a processor 120 in FIG. 1), a first radio frequency integrated circuit (RFIC) 211, a first radio frequency front end (RFFE) 213, a first antenna 215, a second RFIC 221, a second RFFE 223, and/or a second antenna 225.

According to an embodiment, the processor 120 may include an application processor and/or a communication processor. According to an embodiment, the electronic device 101 may further include at least one component among components illustrated in FIG. 1. According to an embodiment, the first RFIC 211, the first RFFE 213, the second RFIC 221, and/or the second RFFE 223 may form at least a portion of a wireless communication module 192 in FIG. 1.

According to an embodiment, the processor 120 may support establishment of a communication channel of a band to be used for a wireless communication with a cellular network (e.g., a second network 199 in FIG. 1) and a network communication through the established communication channel. According to an embodiment, the cellular network may include a 2nd generation (2G) network, a 3rd generation (3G) network, a 4th generation (4G) network, and a long term evolution (LTE) network, and/or a 5th generation (5G) network.

During transmission, the first RFIC 211 may convert a baseband signal generated by the processor 120 into an RF signal of a band (e.g., a band of about 700 MHz to about 3 GHz, or about 6 GHz or less) used in the cellular network. During reception, an RF signal may be received from the cellular network via the first antenna 215 and preprocessed via the first RFFE 213. The first RFIC 211 may convert the RF signal preprocessed via the first RFFE 213 into a baseband signal to be processed by the processor 120.

According to an embodiment, the first RFFE 213 may include a power amplifier (PA) and/or a low noise amplifier (LNA), and perform a power amplification operation and a filtering operation.

According to an embodiment, the processor 120 may support establishment of a communication channel of a band to be used for a wireless communication with a short-range communication network (e.g., a first network 198 in FIG. 1) and a network communication through the established communication channel. According to an embodiment, the short-range communication network may include a network which is based on a Bluetooth scheme (e.g., a Bluetooth low energy (BLE) scheme and/or a legacy Bluetooth scheme), and/or a wireless fidelity (Wi-Fi) scheme.

During transmission, the second RFIC 221 may convert a baseband signal generated by the processor 120 into an RF signal of a band (e.g., a 2.4 GHz band (e.g., a band used in a short-range communication network which is based on the Bluetooth scheme) and/or a 2.4 GHz band and a 5 GHz band (e.g., a band used in a short-range communication network which is based on the Wi-Fi scheme). During reception, an RF signal may be received from the short-range communication network via the second antenna 225 and preprocessed via the second RFFE 223. The second RFIC 221 may convert the RF signal preprocessed via the second RFFE 223 into a baseband signal to be processed by the processor 120.

An external electronic device 200 (e.g., an electronic device 102 in FIG. 1) (e.g., a dongle) may include a processor 250, a first RFIC 271, a first RFFE 273, a first antenna 275, a second RFIC 261, a second RFFE 263, and/or a second antenna 265.

According to an embodiment, the processor 250 may include an application processor and/or a communication processor. According to an embodiment, like the electronic device 101, the external electronic device 200 may further include at least one of components illustrated in FIG. 1.

According to an embodiment, the processor 250 may support establishment of a communication channel of a band to be used for a wireless communication with a cellular network (e.g., a second network 199 in FIG. 1) and a network communication through the established communication channel. According to an embodiment, the cellular network may include a 2G network, a 3G network, a 4G network, and an LTE network, and/or a 5G network.

During transmission, the first RFIC 271 may convert a baseband signal generated by the processor 250 into an RF signal of a band (e.g., a B31 band or 450 MHz band) used in the cellular network. During reception, an RF signal may be received from the cellular network via the first antenna 275 and preprocessed via the first RFFE 273. The first RFIC 271 may convert the RF signal preprocessed via the first RFFE 273 into a baseband signal to be processed by the processor 250.

According to an embodiment, the first RFFE 273 may include a PA and/or an LNA, and may perform a power amplification operation and a filtering operation.

According to an embodiment, the processor 250 may support establishment of a communication channel of a band to be used for a wireless communication with a short-range communication network (e.g., a first network 198 in FIG. 1) and a network communication through the established communication channel. According to an embodiment, the short-range communication network may include a network which is based on a Bluetooth scheme (e.g., a BLE scheme and/or a legacy Bluetooth scheme), and/or a Wi-Fi scheme.

During transmission, the second RFIC 261 may convert a baseband signal generated by the processor 250 into an RF signal of a band (e.g., a 2.4 GHz band (e.g., a band used in a short-range communication network which is based on the Bluetooth scheme) and/or a 2.4 GHz band and a 5 GHz band (e.g., a band used in a short-range communication network which is based on the Wi-Fi scheme). During reception, an RF signal may be received from the short-range communication network via the second antenna 265 and preprocessed via the second RFFE 263. The second RFIC 261 may convert the RF signal preprocessed via the second RFFE 263 into a baseband signal to be processed by the processor 250.

A 4G mobile communication system may support various bands, and a B31 band among the various bands may be a 450 MHz band, and may be used for a communication for which a relatively high security level (e.g., a security level greater than or equal to a threshold security level) is required. The external electronic device 200 supporting the B31 band may be generally implemented in a dongle form, and the external electronic device 200 implemented in the dongle form may be used by being wirelessly coupled to the electronic device 101.

A communication between the external electronic device 200 and the electronic device 101 may be a communication based on a Bluetooth scheme and/or a Wi-Fi scheme. The external electronic device 200 and the electronic device 101 may each transmit and receive a signal of the B31 band (e.g., a signal whose security level is higher than or equal to the threshold security level) via an antenna (e.g., the second antenna 265 in a case of the external electronic device 200 and the second antenna 225 in a case of the electronic device 101). For the connection between the electronic device 101 and the external electronic device 200, a user may execute an application capable of using the external electronic device 200 in the electronic device 101 to set up a connection between the electronic device 101 and the external electronic device 200 which is based on the Bluetooth scheme and/or the Wi-Fi scheme. The electronic device 101 and the external electronic device 200 may perform a communication based on the set-up connection.

If the electronic device 101 transmits the signal of the B31 band whose security level is higher than or equal to the threshold security level to the external electronic device 200, even though the security level of the B31 band signal itself is higher than or equal to the threshold level, when the electronic device 101 and the external electronic device 200 perform a communication through a connection which is based on the Bluetooth scheme and/or the Wi-Fi scheme, security may be vulnerable due to antenna radiation. The communication in a form of the antenna radiation may have a vulnerability of the security such as an attack by a hacker, so it may not be suitable for transmission and reception of a signal for which security is important.

Figure 3:
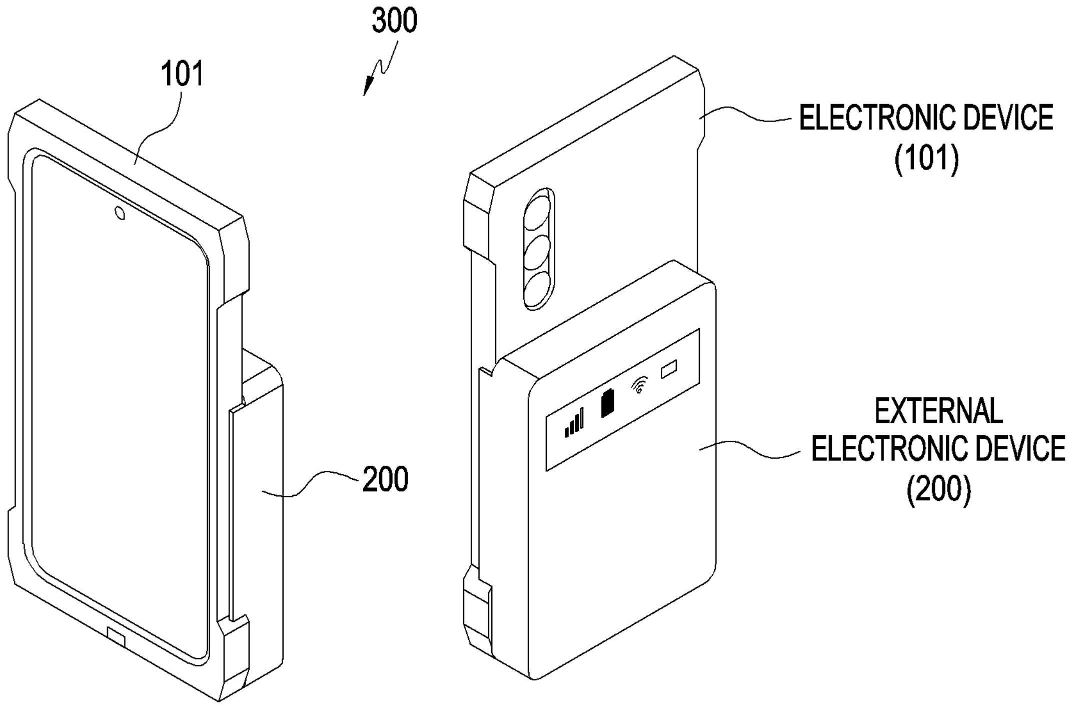
FIG. 3 is a diagram for describing coupling between an electronic device and an external electronic device.

FIG. 3 is a diagram for describing coupling between an electronic device and an external electronic device.

Referring to FIG. 3, each of an electronic device 101 (e.g., an electronic device 101 in FIG. 1 or 2) (e.g., a smart phone) and an external electronic device 200 (e.g., an electronic device 102 in FIG. 1 or an external electronic device 200 in FIG. 2) (e.g., a dongle) may be an independently designed device. The independently designed electronic device 101 and external electronic device 200 may include a structure in which a housing of the electronic device 101 or a housing of the external electronic device 200 may be coupled (300). In an embodiment, portability of the electronic device 101 and the external electronic device 200 may be increased based on the structure in which the housing of the electronic device 101 or the housing of the external electronic device 200 may be coupled.

Figure 4:
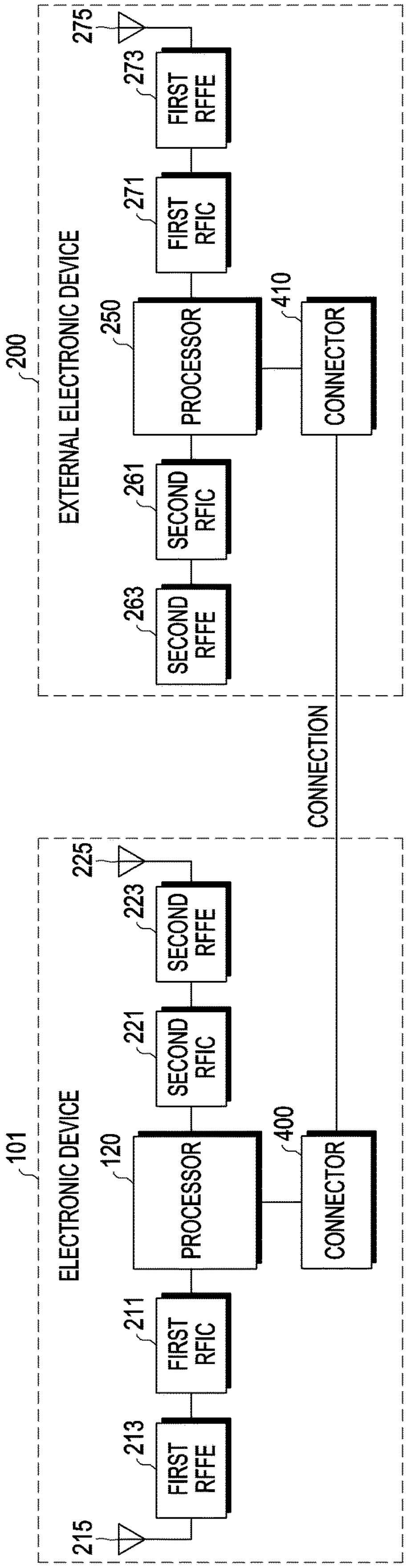
FIG. 4 is a block diagram illustrating an electronic device and an external electronic device according to an embodiment.

FIG. 4 is a block diagram illustrating an electronic device and an external electronic device according to an embodiment.

Referring to FIG. 4, an electronic device 101 (e.g., an electronic device 101 in FIG. 1, 2, or 3) (e.g., a smart phone) may include a processor 120 (e.g., a processor 120 in FIG. 1 or 2), a first RFIC 211 (e.g., a first RFIC 211 in FIG. 2), a first RFFE 213 (e.g., a first RFFE 213 in FIG. 2), a first antenna 215 (e.g., a first antenna 215 in FIG. 2), a second RFIC 221 (e.g., a second RFIC 221 in FIG. 2), a second RFFE 223 (e.g., a second RFFE 223 in FIG. 2), a second antenna 225 (e.g., a second antenna 225 in FIG. 2), and/or a connector 400.

According to an embodiment, the processor 120 may include an application processor and/or a communication processor. According to an embodiment, the electronic device 101 may further include at least one component among components illustrated in FIG. 1. According to an embodiment, the first RFIC 211, the first RFFE 213, the second RFIC 221, and/or the second RFFE 223 may form at least a portion of a wireless communication module 192 in FIG. 1.

According to an embodiment, the processor 120 may support establishment of a communication channel of a band to be used for a wireless communication with a cellular network (e.g., a second network 199 in FIG. 1) and a network communication through the established communication channel.

During transmission, the first RFIC 211 may convert a baseband signal generated by the processor 120 into an RF signal of a band (e.g., a band of about 700 MHz to about 3 GHz, or about 6 GHz or less) used in the cellular network. During reception, an RF signal may be received from the cellular network via the first antenna 215 and preprocessed via the first RFFE 213. The first RFIC 211 may convert the RF signal preprocessed via the first RFFE 213 into a baseband signal to be processed by the processor 120.

According to an embodiment, the first RFFE 213 may include a PA and/or an LNA, and perform a power amplification operation and a filtering operation.

According to an embodiment, the processor 120 may support establishment of a communication channel of a band to be used for a wireless communication with a short-range communication network (e.g., a first network 198 in FIG. 1) and a network communication through the established communication channel. According to an embodiment, the short-range communication network may include a network which is based on a Bluetooth scheme (e.g., a BLE scheme and/or a legacy Bluetooth scheme), and/or a Wi-Fi scheme.

During transmission, the second RFIC 221 may convert a baseband signal generated by the processor 120 into an RF signal of a band (e.g., a 2.4 GHz band (e.g., a band used in a short-range communication network which is based on the Bluetooth scheme) and/or a 2.4 GHz band and a 5 GHz band and/or 6 GHz band (e.g., a band used in a short-range communication network which is based on the Wi-Fi scheme). In FIG. 4, a case that the band used in the short-range communication network based on the Bluetooth scheme is the 2.4 GHz band has been described as an example, however, the Bluetooth scheme may be implemented in a form of using various bands (e.g., the 5 GHz band and/or 6 GHz band) as well as the 2.4 GHz band.

During reception, an RF signal may be received from the short-range communication network via the second antenna 225 and preprocessed via the second RFFE 223. The second RFIC 221 may convert the RF signal preprocessed via the second RFFE 223 into a baseband signal to be processed by the processor 120.

According to an embodiment, the connector 400 may provide an electrical and/or operational connection between the electronic device 101 and an external electronic device 200 (e.g., an electronic device 102 in FIG. 1 or an external electronic device 200 in FIG. 2 or 3) (e.g., a dongle). The connector 400 may include at least one socket, and may be coupled to a connector 410 included in an external electronic device 200 to provide the electrical and/or operational connection. In an embodiment, the connector 400 may provide a physical connection between the electronic device 101 and the external electronic device 200. In an embodiment, the connector 400 may transmit and receive various signals for an interface between the electronic device 101 and the external electronic device 200.

In an embodiment, if the connector 400 includes at least one socket, the connector 410 may include at least one pin. In an embodiment, if the connector 400 includes at least one pin, the connector 410 may include at least one socket. In an embodiment, if the connector 400 includes two sockets and the connector 410 includes two pins, one socket of the connector 400 and one pin of the connector 410 may be used for a physical connection between the electronic device 101 and the external electronic device 200, and the other socket of the connector 400 and the other pin of the connector 410 may be used to transmit and receive various signals for an interface between the electronic device 101 and the external electronic device 200. In an embodiment, if the connector 400 includes two pins and the connector 410 includes two sockets, one pin of the connector 400 and one socket of the connector 410 may be used for the physical connection between the electronic device 101 and the external electronic device 200, and the other pin of the connector 400 and the other socket of the connector 410 may be used to transmit and receive the various signals for the interface between the electronic device 101 and the external electronic device 200. In FIG. 4, a case that the connector 400 includes the pin (or the socket) used to transmit and receive the various signals for the interface between the electronic device 101 and the external electronic device 200 has been described, however, the connector 400 may not include the pin (or the socket) used to transmit and receive the various signals for the interface between the electronic device 101 and the external electronic device 200. In this case, a separate connection part including a pin (or a socket) used to transmit and receive the various signals for the interface between the electronic device 101 and the external electronic device 200 may be implemented.

In an embodiment, the connector 400 may include various types of connectors such as an HDMI connector, a USB connector, an SD card connector, or an audio connector (e.g., a headphone connector).

The external electronic device 200 may include a processor 250 (e.g., a processor 250 in FIG. 2), a first RFIC 271 (e.g., a first RFIC 271 in FIG. 2), a first RFFE 273 (e.g., a first RFFE 273 in FIG. 2), a first antenna 275 (e.g., a first antenna 275 in FIG. 2), a second RFIC 261 (e.g., a second RFIC 261 in FIG. 2), a second RFFE 263 (e.g., a second RFFE 263 in FIG. 2), and/or the connector 410.

According to an embodiment, the processor 250 may include an application processor and/or a communication processor. According to an embodiment, like the electronic device 101, the external electronic device 200 may further include at least one of components illustrated in FIG. 1.

According to an embodiment, the processor 250 may support establishment of a communication channel of a band to be used for a wireless communication with a cellular network (e.g., a second network 199 in FIG. 1) and a network communication through the established communication channel. According to an embodiment, the cellular network may include a 2G network, a 3G network, a 4G network, and an LTE network, and/or a 5G network.

During transmission, the first RFIC 271 may convert a baseband signal generated by the processor 250 into an RF signal of a band (e.g., a B31 band or 450 MHz) used in the cellular network. During reception, an RF signal may be received from the cellular network via the first antenna 275 and preprocessed via the first RFFE 273. The first RFIC 271 may convert the RF signal preprocessed via the first RFFE 273 into a baseband signal to be processed by the processor 250.

According to an embodiment, the first RFFE 273 may include a PA and/or an LNA, and may perform a power amplification operation and a filtering operation.

According to an embodiment, the processor 250 may support establishment of a communication channel of a band to be used for a wireless communication with a short-range communication network (e.g., a first network 198 in FIG. 1) and a network communication through the established communication channel. According to an embodiment, the short-range communication network may include a network which is based on a Bluetooth scheme (e.g., a BLE scheme and/or a legacy Bluetooth scheme), and/or a Wi-Fi scheme.

During transmission, the second RFIC 261 may convert a baseband signal generated by the processor 250 into an RF signal of a band (e.g., a 2.4 GHz band (e.g., a band used in a short-range communication network which is based on the Bluetooth scheme) and/or a 2.4 GHz band and a 5 GHz band and/or 6 GHz band (e.g., a band used in a short-range communication network which is based on the Wi-Fi scheme). During reception, an RF signal may be received from the electronic device 101 via the connector 410 and preprocessed via the second RFFE 263. The second RFIC 261 may convert the RF signal preprocessed via the second RFFE 263 into a baseband signal to be processed by the processor 250.

According to an embodiment, the connector 410 may provide an electrical and/or operational connection between the electronic device 101 and the external electronic device 200. The connector 410 may include at least one pin, and may be coupled to the connector 400 included in the electronic device 101 to provide the electrical and/or operational connection. In an embodiment, the connector 410 may provide a physical connection between the external electronic device 200 and the electronic device 101. In an embodiment, the connector 410 may transmit and receive various signals for an interface between the external electronic device 200 and the electronic device 101.

In an embodiment, if the connector 410 includes two sockets and the connector 400 includes two pins, one socket of the connector 410 and one pin of the connector 400 may be used for a physical connection between the external electronic device 200 and the electronic device 101, and the other socket of the connector 410 and the other pin of the connector 400 may be used to transmit and receive various signals for an interface between the external electronic device 200 and the electronic device 101. In an embodiment, if the connector 410 includes two pins and the connector 400 includes two sockets, one pin of the connector 410 and one socket of the connector 400 may be used for the physical connection between the external electronic device 200 and the electronic device 101, and the other pin of the connector 410 and the other socket of the connector 400 may be used to transmit and receive the various signals for the interface between the external electronic device 200 and the electronic device 101. In FIG. 4, a case that the connector 410 includes the pin (or the socket) used to transmit and receive the various signals for the interface between the external electronic device 200 and the electronic device 101 has been described, however, the connector 410 may not include the pin (or the socket) used to transmit and receive the various signals for the interface between the external electronic device 200 and the electronic device 101. In this case, a separate connection part including a pin (or a socket) used to transmit and receive the various signals for the interface between the external electronic device 200 and the electronic device 101 may be implemented.

In various embodiments, the connector 410 may include various types of connectors such as an HDMI connector, a USB connector, an SD card connector, or an audio connector (e.g., a headphone connector).

As described in FIG. 4, in the 4G mobile communication system, the external electronic device 200 supporting the B31 band used for a communication requiring a relatively high security level (e.g., a security level higher than a threshold security level) may be coupled to the electronic device 101 using connectors rather than being wirelessly coupled to the electronic device 101. In FIG. 4, the coupling of the electronic device 101 and the external electronic device 200 has been described by taking the 4G mobile communication system as an example of the mobile communication system, and by taking the B31 band as an example of the band used for the communication requiring the relatively high security level (e.g., the security level greater than or equal to the threshold security level), however, the coupling of the electronic device 101 and the external electronic device 200 according to the disclosure may be also applied to other communication systems as well as the 4G mobile communication system and to other bands as well as the B31 band.

If the connection between the external electronic device 200 and the electronic device 101 is a connection via the connectors, a security vulnerability such as an attack of a hacker which may occur due to antenna radiation may be reduced compared to a case that the connection between the external electronic device 200 and the electronic device 101 is a connection which is based on a Bluetooth scheme and/or a Wi-Fi scheme.

According to an embodiment, the electronic device 101 may transmit, to the external electronic device 200, a signal of the B31 band whose security level is higher than or equal to the threshold security level through the connection between the connectors, so a security level for the signal of the B31 band may be maintained.

Figure 5:
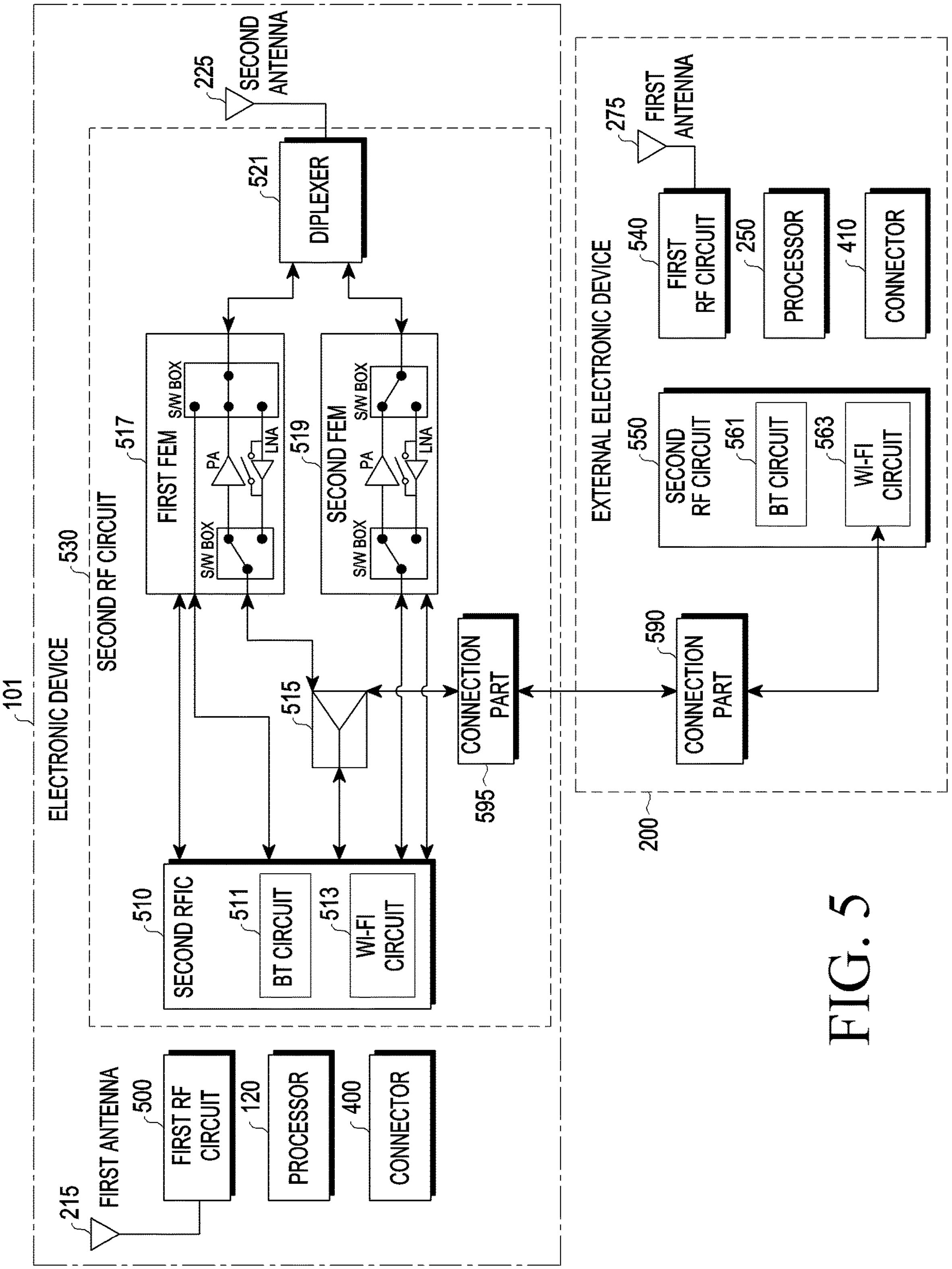
FIG. 5 is a block diagram illustrating an electronic device and an external electronic device according to an embodiment.

FIG. 5 is a block diagram illustrating an electronic device and an external electronic device according to an embodiment.

Referring to FIG. 5, an electronic device 101 (e.g., an electronic device 101 in FIG. 1, 2, 3, or 4) (e.g., a smart phone) may include a processor 120 (e.g., a processor 120 in FIG. 1, 2 or 4), a first RF circuit 500, a second RF circuit 530, a first antenna 215 (e.g., a first antenna 215 in FIG. 2 or 4), a second antenna 225 (e.g., a second antenna 225 in FIG. 2 or 4), a connection part 595, and/or a connector 400 (e.g., a connector 400 in FIG. 4).

According to an embodiment, the first RF circuit 500 may include a first RFIC (e.g., a first RFIC 211 in FIG. 2 or 4) and/or a first RFFE (e.g., a first RFFE 213 in FIG. 2 or 4), and the first RFIC and the first RFFE may be implemented similarly to or substantially the same as those described in FIG. 2 or 4, so a detailed description thereof will be omitted.

According to an embodiment, the connector 400 may be implemented similarly to or substantially the same as that described in FIG. 4, so a detailed description thereof will be omitted.

According to an embodiment, the first antenna 215 and the second antenna 225 may be implemented similarly to or substantially the same as those described in FIG. 2 or 4, so a detailed description thereof will be omitted.

According to an embodiment, the second RF circuit 530 may include a second RFIC 510 (e.g., a second RFIC 221 in FIG. 2 or 4), a divider 515, a first front-end module (FEM) 517, a second FEM 519, and a diplexer 521. According to an embodiment, the divider 515 may be replaced with a splitter.

According to an embodiment, the second RFIC 510 may include a Bluetooth circuit (hereinafter, referred to as a "BT circuit") 511 and/or a Wi-Fi circuit 513.

During transmission, the BT circuit 511 may convert a baseband signal generated by the processor 120 into an RF signal of a 2.4 GHz band. During reception, an RF signal may be received from a short-range communication network via the second antenna 225, and the signal received via the second antenna 225 may be inputted to the diplexer 521. The diplexer 521 may output a 2.4 GHz signal among signals received via the second antenna 225 to the first FEM 517, and output a 5 GHz signal and/or 6 GHz signal among signals received via the second antenna 225 to the second FEM 519. In FIG. 5, a case that a band used in the Bluetooth scheme is the 2.4 GHz band has been described as an example, however, the Bluetooth scheme may be implemented in a form of using various bands (e.g., the 5 GHz band and/or 6 GHz band) as well as the 2.4 GHz band.

During transmission, the Wi-Fi circuit 513 may convert a baseband signal generated by the processor 120 into an RF signal of the 2.4 GHz band, the 5 GHz band, and/or 6 GHz band. During reception, an RF signal may be received from a short-range communication network via the second antenna 225, and the signal received via the second antenna 225 may be inputted to the diplexer 521. The diplexer 521 may output a 2.4 GHz signal among signals received via the second antenna 225 to the first FEM 517, and may output a 5 GHz signal and/or 6 GHz signal among the signals received via the second antenna 225 to the second FEM 519.

According to an embodiment, the divider 515 may be disposed on at least one of a path corresponding to the 2.4 GHz band supported by the BT circuit 511 (hereinafter, referred to as a "BT 2.4 GHz path"), a path corresponding to the 2.4 GHz band supported by the Wi-Fi circuit 513 (hereinafter, referred to as a "Wi-Fi 2.4 GHz path"), or a path corresponding to the 5 GHz band and/or 6 GHz band supported by the Wi-Fi circuit 513 (hereinafter, referred to as a "Wi-Fi 5 GHz path and/or 6 GHz path"). FIG. 5 shows a case that the divider 515 is disposed on the Wi-Fi 2.4 GHz path.

According to an embodiment, the processor 120 may include an application processor and/or a communication processor. According to an embodiment, the processor 120 may support establishment of a communication channel of a band to be used for a wireless communication with a cellular network (e.g., a second network 199 in FIG. 1) and a network communication through the established communication channel. According to an embodiment, the processor 120 may support establishment of a communication channel of a band to be used for a wireless communication with a short-range communication network (e.g., a first network

198 in FIG. 1) and a network communication through the established communication channel. According to an embodiment, the short-distance communication network may include a network which is based on a Bluetooth scheme (e.g., a BLE scheme and/or a legacy Bluetooth scheme), and/or a Wi-Fi scheme.

According to an embodiment, data to be transmitted from the electronic device 101 to the external electronic device 200 may be converted into an RF signal of a 2.4 GHz in the Wi-Fi circuit 513, and the converted RF signal may be transferred to the divider 515. The divider 515 may input the RF signal outputted from the Wi-Fi circuit 513, and transfer the RF signal to the first FEM 517 and/or the connection part 595 to transfer the RF signal to the Wi-Fi circuit 563 of the external electronic device 200 via the connection part 595. The RF signal may be transferred to the connection part 595 via the divider 515 to be transferred to the first FEM 517 as well as to the Wi-Fi circuit 563 of the external electronic device 200 via the connection part 595, so the RF signal may be radiated to the outside via the second antenna 225. In an embodiment, in order to prevent the RF signal corresponding to the communication between the electronic device 101 and the external electronic device 200 from being radiated via the second antenna 225, the processor 120 may turn off a PA (e.g., a PA included in the first FEM 517) connected to the Wi-Fi 2.4 GHz path when identifying that the electronic device 101 and the external electronic device 200 are connected. As the PA connected to the Wi-Fi 2.4 GHz path is turned off, the RF signal corresponding to the communication between the electronic device 101 and the external electronic device 200 may be prevented from being radiated via the second antenna 225, the RF signal corresponding to the communication between the electronic device 101 and the external electronic device 200 may be transferred only to the Wi-Fi circuit 563 of the external electronic device 200, so a security issue may not occur.

According to an embodiment, the processor 120 may identify that the electronic device 101 and the external electronic device 200 are connected via the connector 400. According to an embodiment, the processor 120 may identify that the electronic device 101 and the external electronic device 200 are connected via the second RFIC 510. According to an embodiment, if a Wi-Fi connection is set up between the electronic device 101 and the external electronic device 200, the processor 120 may identify that the electronic device 101 and the external electronic device 200 are connected. According to an embodiment, if the electronic device 101 requires a Wi-Fi connection to the external electronic device 200, the processor 120 may set up the Wi-Fi connection with the external electronic device 200. According to an embodiment, the processor 120 may set up a Wi-Fi connection between the electronic device 101 and the external electronic device 200 according to a request of the external electronic device 200. According to an embodiment, the processor 120 may release a connection between the electronic device 101 and the external electronic device 200. If the connection between the electronic device 101 and the external electronic device 200 is released, the processor 120 may turn on the PA connected to the Wi-Fi 2.4 GHz path which has been turned off. According to an embodiment, the processor 120 may execute a set application to release the connection between the electronic device 101 and the external electronic device 200. According to an embodiment, the processor 120 may detect that the connection between the electronic device 101 and the external electronic device 200 is released via the connector 400. According to an embodiment, when receiving, via the connector 400, a connection release request requesting to release the connection between the electronic device 101 and the external electronic device 200 from the external electronic device 200, the processor 120 may release the connection between the electronic device 101 and the external electronic device 200.

The connection part 595 may transmit and receive various signals for an interface between the electronic device 101 and the external electronic device 200. The connection part 595 may transfer a signal transferred via the divider 515 to the connection part 590 of the external electronic device 200. In an embodiment, the connection part 595 may be implemented in a connector form, and may include various types of connectors such as an HDMI connector, a USB connector, an SD card connector, or an audio connector (e.g., a headphone connector). In FIG. 5, a case that the connection part 595 and the connector 400 are implemented separately is illustrated, however, as described in FIG. 4, the connection part 595 and the connector 400 may be integrated.

The external electronic device 200 may include a processor 250 (e.g., a processor 250 in FIG. 2 or 4), a first RF circuit 540, a second RF circuit 550, a connection part 590, and/or a connector 410.

According to an embodiment, the first RF circuit 540 may include a first RFIC (e.g., a first RFIC 271 in FIG. 2 or 4) and/or a first RFFE (e.g., a first RFFE 273 in FIG. 2 or 4), and the first RFIC and the first RFFE may be implemented similarly to or substantially the same as those described in FIG. 2 or 4, so a detailed description thereof will be omitted.

According to an embodiment, the connector 410 may be implemented similarly to or substantially the same as that described in FIG. 4, so a detailed description thereof will be omitted.

According to an embodiment, the first antenna 275 may be implemented similarly to or substantially the same as that described in FIG. 2 or 4, so a detailed description thereof will be omitted.

According to an embodiment, the second RF circuit 550 may include a BT circuit 561 and/or a Wi-Fi circuit 563.

During transmission, the BT circuit 561 may convert a baseband signal generated by the processor 250 into an RF signal of a 2.4 GHz band. During reception, an RF signal may be received from the electronic device 101 via the divider 515 of the electronic device 101, the BT circuit 561 may convert the signal received from the electronic device 101 into a baseband signal to be processed by the processor 250.

During transmission, the Wi-Fi circuit 563 may convert a baseband signal generated by the processor 250 into an RF signal of the 2.4 GHz band, and the 5 GHz band and/or 6 GHz band. During reception, an RF signal may be received from the electronic device 101 via the divider 515 of the electronic device 101, and the Wi-Fi circuit 563 may convert the signal received from the electronic device 101 into a baseband signal to be processed by the processor 250.

In FIG. 5, a case that the connection between the electronic device 101 and the external electronic device 200 is based on the Wi-Fi scheme using the 2.4 GHz band, and the 5 GHz band and/or 6 GHz band has been described as an example, so a case that an RF signal is received from the electronic device 101 via the divider 515 of the electronic device 101, and the Wi-Fi circuit 563 converts the signal received from the electronic device 101 into a baseband signal to be processed by the processor 250 will be described as an example. Unlike this, if the connection between the electronic device 101 and the external electronic device 200 is based on the Bluetooth scheme using the 2.4 GHz band, the divider 515 may be connected to the BT circuit 561.

The connection part 590 may transmit and receive various signals for an interface between the external electronic device 200 and the electronic device 101. The connection part 590 may transfer a signal transferred via the Wi-Fi circuit 563 to the connection part 595 of the electronic device 101. In an embodiment, the connection part 590 may be implemented in a connector form, and may include various types of connectors such as an HDMI connector, a USB connector, an SD card connector, or an audio connector (e.g., a headphone connector). In FIG. 5, a case that the connection part 590 and the connector 410 are implemented separately is illustrated, however, as described in FIG. 4, the connection part 590 and the connector 410 may be integrated.

According to an embodiment, the processor 250 may include an application processor and/or a communication processor. According to an embodiment, like the electronic device 101, the external electronic device 200 may further include at least one of components illustrated in FIG. 1.

According to an embodiment, the processor 250 may support establishment of a communication channel of a band to be used for a wireless communication with a cellular network (e.g., a second network 199 in FIG. 1) and a network communication through the established communication channel. According to an embodiment, the cellular network may include a 2G network, a 3G network, a 4G network, and an LTE network, and/or a 5G network.

According to an embodiment, the processor 250 may support establishment of a communication channel of a band to be used for a wireless communication with a short-range communication network (e.g., a first network 198 in FIG. 1) and a network communication through the established communication channel. According to an embodiment, the short-range communication network may include a network which is based on a Bluetooth scheme (e.g., a BLE scheme and/or a legacy Bluetooth scheme), and/or a Wi-Fi scheme.

According to an embodiment, the processor 250 may identify that the electronic device 101 and the external electronic device 200 are connected via the connector 410. According to an embodiment, the processor 250 may identify that the electronic device 101 and the external electronic device 200 are connected via the second RF circuit 550. According to an embodiment, if a Wi-Fi connection is set up between the electronic device 101 and the external electronic device 200, the processor 250 may identify that the electronic device 101 and the external electronic device 200 are connected. According to an embodiment, if the external electronic device 200 requires a Wi-Fi connection to the electronic device 101, the processor 250 may set up the Wi-Fi connection with the electronic device 101. According to an embodiment, the processor 250 may set up a Wi-Fi connection between the electronic device 101 and the external electronic device 200 according to a request of the electronic device 101.

As described in FIG. 5, in the 4G mobile communication system, the external electronic device 200 supporting the B31 band used for a communication requiring a relatively high security level (e.g., a security level higher than a threshold security level) may be coupled to the electronic device 101 using connectors rather than being wirelessly coupled to the electronic device 101.

If the connection between the external electronic device 200 and the electronic device 101 is a connection via the connectors (or the connection parts), a security vulnerability such as an attack of a hacker which may occur due to antenna radiation may be reduced compared to a case that the connection between the external electronic device 200 and the electronic device 101 is a connection which is based on a Bluetooth scheme and/or a Wi-Fi scheme.

According to an embodiment, the electronic device 101 may transmit, to the external electronic device 200, a signal of the B31 band whose security level is higher than or equal to the threshold security level through the connection between the connectors, so a security level for the signal of the B31 band may be maintained.

Figure 6A:
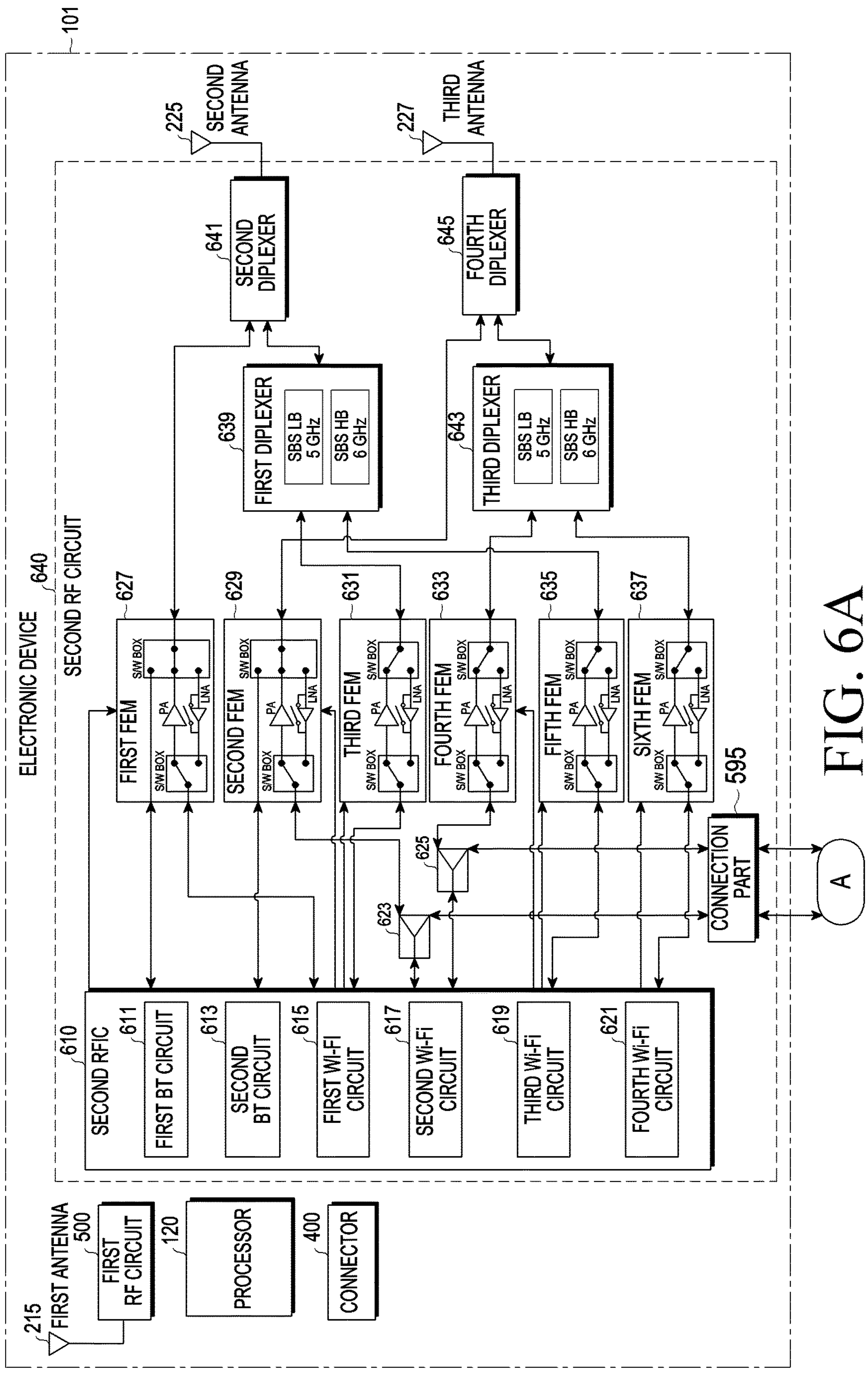
FIG. 6A is a block diagram illustrating an electronic device according to an embodiment.

FIG. 6A is a block diagram illustrating an electronic device according to an embodiment.

Referring to FIG. 6A, an electronic device 101 (e.g., an electronic device 101 in FIG. 1, 2, 3, 4, or 5) (e.g., a smart phone) may include a processor 120 (e.g., a processor 120 in FIG. 1, 2, 4, or 5), a first RF circuit 500 (e.g., a first RF circuit 500 in FIG. 5), a second RF circuit 640 (e.g., a second RF circuit 530 in FIG. 5), a first antenna 215 (e.g., a first antenna 215 in FIG. 2, 4, or 5), a second antenna 225 (e.g., a second antenna 225 in FIG. 2, 4, or 5), a third antenna 227, a connection part 595, and/or a connector 400 (e.g., a connector 400 in FIG. 4 or 5).

Compared to an electronic device 101 illustrated in FIG. 5, the electronic device 101 illustrated in FIG. 6A may support a multi link operation (MLO) of a Wi-Fi scheme (e.g., a Wi-Fi 7 scheme), and may include a plurality of Wi-Fi circuits (e.g., a first Wi-Fi circuit 615, a second Wi-Fi circuit 617, a third Wi-Fi circuit 619, and a fourth Wi-Fi circuit 621) in order for the second RFIC 610 to support the MLO. The second RFIC 610 may further include a plurality of BT circuits (e.g., a first BT circuit 611 and a second BT circuit 613), and whether the second RFIC 610 further includes the plurality of BT circuits (e.g., the first BT circuit 611 and the second BT circuit 613) may be determined in consideration of efficient coupling between the electronic device 101 and the external electronic device 200.

According to an embodiment, the first RF circuit 500 may include a first RFIC (e.g., a first RFIC 211 in FIG. 2 or 4) and/or a first RFFE (e.g., a first RFFE 213 in FIG. 2 or 4), and the first RFIC and the first RFFE may be implemented similarly to or substantially the same as those described in FIG. 2 or 4, so a detailed description thereof will be omitted.

According to an embodiment, the connector 400 may be implemented similarly to or substantially the same as that described in FIG. 4, so a detailed description thereof will be omitted.

According to an embodiment, the connection part 595 may be implemented similarly to or substantially the same as that described in FIG. 5, so a detailed description thereof will be omitted.

According to an embodiment, the first antenna 215 and the second antenna 225 may be implemented similarly to or substantially the same as those described in FIG. 2, 4, or 5, so a detailed description thereof will be omitted.

According to an embodiment, the second RF circuit 640 may include a second RFIC 610 (e.g., a second RFIC 221 in FIG. 2 or 4, or a second RFIC 520 in FIG. 5), a first divider 623, a second divider 625, a first FEM 627, a second FEM 629, a third FEM 631, a fourth FEM 633, a fifth FEM 635, a sixth FEM 637, a first diplexer 639, a second diplexer 641, a third diplexer 643, and a fourth diplexer 645. According to an embodiment, each of the first divider 623 and the second divider 625 may be replaced with a splitter.

According to an embodiment, the second RFIC 610 may include a plurality of BT circuits (e.g., a first BT circuit 611 and a second BT circuit 613), and/or a plurality of Wi-Fi circuits (e.g., a first Wi-Fi circuit 615, a second Wi-Fi circuit 617, a third Wi-Fi circuit 619, and a fourth Wi-Fi circuit 621).

According to an embodiment, during transmission, the first BT circuit 611 may convert a baseband signal generated by the processor 120 into an RF signal of a 2.4 GHz band. In an embodiment, the RF signal of the 2.4 GHz band outputted from the first BT circuit 611 may be a signal corresponding to a first channel among a plurality of (e.g., two) channels provided in the Bluetooth scheme. In FIG. 6A, a case that a band used in the Bluetooth scheme is the 2.4 GHz band has been described as an example, however, the Bluetooth scheme may be implemented in a form of using not only the 2.4 GHz band but also various bands (e.g., a 5 GHz band and/or a 6 GHz band).

During transmission, the second BT circuit 613 may convert a baseband signal generated by the processor 120 into an RF signal of the 2.4 GHz band. In an embodiment, the RF signal of the 2.4 GHz band outputted from the second BT circuit 613 may be a signal corresponding to a second channel among the plurality of (e.g., the two) channels provided in the Bluetooth scheme.

According to an embodiment, the first Wi-Fi circuit 615 may convert a baseband signal generated by the processor 120 into an RF signal of the 2.4 GHz band, the 5 GHz band, and/or the 6 GHz band. In an embodiment, the RF signal of the 2.4 GHz band, the 5 GHz band, and/or the 6 GHz band outputted from the first Wi-Fi circuit 615 may be a signal corresponding to a first channel among a plurality of (e.g., two) channels provided in the Wi-Fi scheme, and may be a signal corresponding to a first core bandwidth (e.g., 160 MHz).

According to an embodiment, the second Wi-Fi circuit 617 may convert a baseband signal generated by the processor 120 into an RF signal of the 2.4 GHz band, the 5 GHz band, and/or the 6 GHz band. In an embodiment, the RF signal of the 2.4 GHz band, the 5 GHz band, and/or the 6 GHz band outputted from the second Wi-Fi circuit 617 may be a signal corresponding to the second channel among the plurality of (e.g., the two) channels provided in the Wi-Fi scheme, and may be a signal corresponding to the first core bandwidth.

According to an embodiment, the third Wi-Fi circuit 619 may convert a baseband signal generated by the processor 120 into an RF signal of the 2.4 GHz band, the 5 GHz band, and/or the 6 GHz band. In an embodiment, the RF signal of the 2.4 GHz band, the 5 GHz band, and/or the 6 GHz band outputted from the third Wi-Fi circuit 619 may be a signal corresponding to a first channel among a plurality of (e.g., two) channels provided in the Wi-Fi scheme, and may be a signal corresponding to a second core bandwidth (e.g., 320 MHz).

According to an embodiment, the fourth Wi-Fi circuit 621 may convert a baseband signal generated by the processor 120 into an RF signal of the 2.4 GHz band, the 5 GHz band, and/or the 6 GHz band. In an embodiment, the RF signal of the 2.4 GHz band, the 5 GHz band, and/or the 6 GHz band outputted from the fourth Wi-Fi circuit 621 may be a signal corresponding to a second channel among a plurality of (e.g., two) channels provided in the Wi-Fi scheme, and may be a signal corresponding to the second core bandwidth.

During reception, an RF signal is received from a short-range communication network via the second antenna 225, and the signal received via the second antenna 225 may be inputted to the second diplexer 641. The second diplexer 641 may output a 2.4 GHz signal among signals received via the second antenna 225 to the first FEM 627, and may output 5 GHz and/or 6 GHz signals among the signals received via the second antenna 225 to the first diplexer 639. The first diplexer 639 may input the signals outputted from the second diplexer 641 and output a first band signal (e.g., a high band (HB) signal or a 6 GHz signal) among the signals outputted from the second diplexer 641 to the fifth FEM 635, and output a second band signal (e.g., a low band (LB) signal or a 5 GHz signal) among the signals outputted from the second diplexer 641 to the third FEM 631. In an embodiment, the electronic device 101 supports an MLO, so a plurality of (e.g., 4) links may be supported in the Wi-Fi scheme.

During reception, an RF signal is received from the short-range communication network via the third antenna 227, and the signal received via the third antenna 227 may be inputted to the fourth diplexer 645. The fourth diplexer 645 may output a 2.4 GHz signal among signals received via the third antenna 227 to the second FEM 629, and may output 5 GHz and/or 6 GHz signals among the signals received via the third antenna 227 to the third diplexer 643. The third diplexer 643 may input the signals outputted from the fourth diplexer 645 and output a first band signal (e.g., an HB signal or a 6 GHz signal) among the signals outputted from the fourth diplexer 645 to the fourth FEM 633, and output a second band signal (e.g., an LB signal or a 5 GHz signal) among the signals outputted from the fourth diplexer 645 to the sixth FEM 637.

According to an embodiment, the first divider 623 may be disposed on a Wi-Fi 2.4 GHz path supported by the second Wi-Fi circuit 617, and the second divider 625 may be disposed on a Wi-Fi 5/6 GHz path supported by the second Wi-Fi circuit 617. A case that the first divider 623 is disposed on the Wi-Fi 2.4 GHz path supported by the second Wi-Fi circuit 617, and the second divider 625 is disposed on the Wi-Fi 5/6 GHz path supported by the second Wi-Fi circuit 617 has been shown in FIG. 6A, however, the first divider 623 may be disposed on a Wi-Fi 2.4 GHz path supported by at least one of the first Wi-Fi circuit 615, the third Wi-Fi circuit 619, or the fourth Wi-Fi circuit 621, and the second divider 625 may be disposed on a Wi-Fi 5/6 GHz path supported by at least one of the first Wi-Fi circuit 615, the third Wi-Fi circuit 619, or the fourth Wi-Fi circuit 621.

According to an embodiment, the processor 120 may include an application processor and/or a communication processor. According to an embodiment, the processor 120 may support establishment of a communication channel of a band to be used for a wireless communication with a cellular network (e.g., a second network 199 in FIG. 1) and a network communication through the established communication channel. According to an embodiment, the processor 120 may support establishment of a communication channel of a band to be used for a wireless communication with a short-range communication network (e.g., a first network 198 in FIG. 1) and a network communication through the established communication channel. According to an embodiment, the short-distance communication network may include a network which is based on a Bluetooth scheme (e.g., a BLE scheme and/or a legacy Bluetooth scheme), and/or a Wi-Fi scheme.

According to an embodiment, data to be transmitted from the electronic device 101 to the external electronic device 200 may be converted into an RF signal of a 2.4 GHz or a 5/6 GHz in the second Wi-Fi circuit 617, and the converted RF signal may be transferred to the first divider 623 or the second divider 625.

The first divider 623 may input the RF signal outputted from the second Wi-Fi circuit 617 and transfer the RF signal to the second FEM 629 and the connection part 595. The connection part 595 may transfer the signal received via the first divider 623 to the connection part 590 of the external electronic device 200. The connection part 590 may transfer the signal received via the connection par 595 to the Wi-Fi circuit 563. The RF signal is transferred not only to the connection part 590 of the external electronic device 200 via the first divider 623 but also to the second FEM 629, so the RF signal may be radiated to the outside via the third antenna 227. In an embodiment, in order to prevent the RF signal corresponding to the communication between the electronic device 101 and the external electronic device 200 from being radiated via the third antenna 227, the processor 120 may turn off a PA (e.g., a PA included in the second FEM 629) connected to the Wi-Fi 2.4 GHz path when identifying that the electronic device 101 and the external electronic device 200 are connected. As the PA connected to the Wi-Fi 2.4 GHz path is turned off, the RF signal corresponding to the communication between the electronic device 101 and the external electronic device 200 may be prevented from being radiated via the third antenna 227, the RF signal corresponding to the communication between the electronic device 101 and the external electronic device 200 may be transferred only to the Wi-Fi circuit 563 of the external electronic device 200, so a security issue may not occur.

The second divider 625 may input the RF signal outputted from the second Wi-Fi circuit 617 and transfer the RF signal to the fourth FEM 633 and the connection part 595. The connection part 595 may transfer the signal received via the second divider 625 to the connection part 590 of the external electronic device 200. The connection part 590 may transfer the signal received via the connection part 595 to the Wi-Fi circuit 563. The RF signal is transferred not only to the connection part 590 of the external electronic device 200 via the second divider 625 but also to the fourth FEM 633, so the RF signal may be radiated to the outside via the third antenna 227. In an embodiment, in order to prevent the RF signal corresponding to the communication between the electronic device 101 and the external electronic device 200 from being radiated via the third antenna 227, the processor 120 may turn off a PA (e.g., a PA included in the fourth FEM 633) connected to the Wi-Fi 5/6 GHz path when identifying that the electronic device 101 and the external electronic device 200 are connected. As the PA connected to the Wi-Fi 5/6 GHz path is turned off, the RF signal corresponding to the communication between the electronic device 101 and the external electronic device 200 may be prevented from being radiated via the third antenna 227, the RF signal corresponding to the communication between the electronic device 101 and the external electronic device 200 may be transferred only to the Wi-Fi circuit 563 of the external electronic device 200, so a security issue may not occur.

According to an embodiment, the processor 120 may identify that the electronic device 101 and the external electronic device 200 are connected via the connector 400. According to an embodiment, the processor 120 may identify that the electronic device 101 and the external electronic device 200 are connected via the second RFIC 610. According to an embodiment, if a Wi-Fi connection is set up between the electronic device 101 and the external electronic device 200, the processor 120 may identify that the electronic device 101 and the external electronic device 200 are connected. According to an embodiment, if the electronic device 101 requires a Wi-Fi connection to the external electronic device 200, the processor 120 may set up the Wi-Fi connection with the external electronic device 200. According to an embodiment, the processor 120 may set up a Wi-Fi connection between the electronic device 101 and the external electronic device 200 according to a request of the external electronic device 200.

Figure 6B:
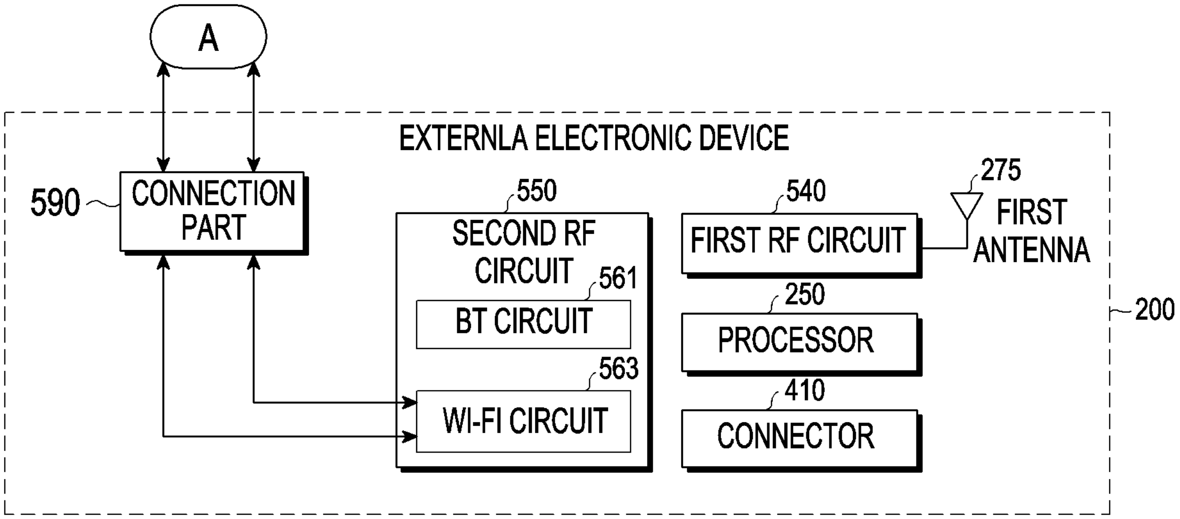
FIG. 6B is a block diagram illustrating an external electronic device according to an embodiment.

FIG. 6B is a block diagram illustrating an external electronic device according to an embodiment.

Referring to FIG. 6B, an external electronic device 200 may include a processor 250 (e.g., a processor 250 in FIG. 2 or 4), a first RF circuit 540, a second RF circuit 550, a connection part 590, and/or a connector 410.

According to an embodiment, the first RF circuit 540 may include a first RFIC (e.g., a first RFIC 271 in FIG. 2 or 4) and/or a first RFFE (e.g., a first RFFE 273 in FIG. 2 or 4), and the first RFIC and the first RFFE may be implemented similarly to or substantially the same as those described in FIG. 2 or FIG. 4, so a detailed description thereof will be omitted.

According to an embodiment, the connector 410 may be implemented similarly to or substantially the same as that described in FIG. 4, so a detailed description thereof will be omitted.

According to an embodiment, the connection part 590 may be implemented similarly to or substantially the same as that described in FIG. 5, so a detailed description thereof will be omitted.

According to an embodiment, the first antenna 275 may be implemented similarly to or substantially the same as that described in FIG. 2 or 4, so a detailed description thereof will be omitted.

According to an embodiment, the second RF circuit 550 may include a BT circuit 561 and/or a Wi-Fi circuit 563.

During transmission, the BT circuit 561 may convert a baseband signal generated by the processor 250 into an RF signal of a 2.4 GHz band. During reception, an RF signal may be received from the electronic device 101 via the first divider 623 or the second divider 625 of the electronic device 101, the BT circuit 561 may convert the signal received from the electronic device 101 into a baseband signal to be processed by the processor 250.

During transmission, the Wi-Fi circuit 563 may convert a baseband signal generated by the processor 250 into an RF signal of the 2.4 GHz band, and the 5 GHz and/or 6 GHz band. During reception, an RF signal may be received from the electronic device 101 via the first divider 623 or the second divider 625 of the electronic device 101, and the Wi-Fi circuit 563 may convert the signal received from the electronic device 101 into a baseband signal to be processed by the processor 250.

In FIGS. 6A and 6B, a case that the connection between the electronic device 101 and the external electronic device 200 is based on the Wi-Fi scheme using the 2.4 GHz band, and the 5 GHz band and/or 6 GHz band has been described as an example, so a case that an RF signal is received from the electronic device 101 via the first divider 623 or the second divider 625 of the electronic device 101, and the Wi-Fi circuit 563 converts the signal received from the electronic device 101 into a baseband signal to be processed by the processor 250 will be described as an example. Unlike this, if the connection between the electronic device 101 and the external electronic device 200 is based on the Bluetooth scheme using the 2.4 GHz band, the first divider 623 or the second divider 625 may be connected to the BT circuit 561.

According to an embodiment, the processor 250 may include an application processor and/or a communication processor. According to an embodiment, like the electronic device 101, the external electronic device 200 may further include at least one of components illustrated in FIG. 1.

According to an embodiment, the processor 250 may support establishment of a communication channel of a band to be used for a wireless communication with a cellular network (e.g., a second network 199 in FIG. 1) and a network communication through the established communication channel. According to an embodiment, the cellular network may include a 2G network, a 3G network, a 4G network, and an LTE network, and/or a 5G network.

According to an embodiment, the processor 250 may support establishment of a communication channel of a band to be used for a wireless communication with a short-range communication network (e.g., a first network 198 in FIG. 1) and a network communication through the established communication channel. According to an embodiment, the short-range communication network may include a network which is based on a Bluetooth scheme (e.g., a BLE scheme and/or a legacy Bluetooth scheme), and/or a Wi-Fi scheme.

According to an embodiment, the processor 250 may identify that the electronic device 101 and the external electronic device 200 are connected via the connector 410. According to an embodiment, the processor 250 may identify that the electronic device 101 and the external electronic device 200 are connected via the second RF circuit 550. According to an embodiment, if a Wi-Fi connection is set up between the electronic device 101 and the external electronic device 200, the processor 250 may identify that the electronic device 101 and the external electronic device 200 are connected. According to an embodiment, if the external electronic device 200 requires a Wi-Fi connection to the electronic device 101, the processor 250 may set up the Wi-Fi connection with the electronic device 101. According to an embodiment, the processor 250 may set up a Wi-Fi connection between the electronic device 101 and the external electronic device 200 according to a request of the electronic device 101.

As described in FIGS. 6A and 6B, in the 4G mobile communication system, the external electronic device 200 supporting the B31 band used for a communication requiring a relatively high security level (e.g., a security level higher than a threshold security level) may be coupled to the electronic device 101 using connectors rather than being wirelessly coupled to the electronic device 101.

If the connection between the external electronic device 200 and the electronic device 101 is a connection via the connectors (or the connection parts), a security vulnerability such as an attack of a hacker which may occur due to antenna radiation may be reduced compared to a case that the connection between the external electronic device 200 and the electronic device 101 is a connection which is based on a Bluetooth scheme and/or a Wi-Fi scheme.

According to an embodiment, the electronic device 101 may transmit, to the external electronic device 200, a signal of the B31 band whose security level is higher than or equal to the threshold security level through the connection between the connectors, so a security level for the signal of the B31 band may be maintained.

According to an embodiment, an electronic device (e.g., an electronic device 101 in FIG. 1, 2, 3, 4, 5, or 6A) may include at least one antenna (e.g., a first antenna 225 in FIG. 4, 5, or 6A, or a second antenna 227 in FIG. 6A), at least one radio frequency (RF) circuit (e.g., a second RF circuit 530 in FIG. 5, or a second RF circuit 640 in FIG. 6A) including at least one radio frequency integrated circuit (RFIC) (e.g., a second RFIC 510 in FIG. 4 or 5, or a second RFIC 610 in FIG. 6A), at least one power amplifier (PA) connected to the at least one antenna (e.g., the first antenna 225 in FIG. 4, 5, or 6A, or the second antenna 227 in FIG. 6A), and at least one divider (e.g., a divider 515 in FIG. 5, or a first divider 623 or a second divider 625 in FIG. 6A) connected to the at least one RFIC (e.g., the second RFIC 510 in FIG. 4 or 5, or the second RFIC 610 in FIG. 6A) and the at least one PA, a connection part (e.g., a connection part 595 in FIG. 5 or 6A) connected to the at least one divider (e.g., the divider 515 in FIG. 5, or the first divider 623 or the second divider 625 in FIG. 6A), and at least one processor (e.g., a processor 120 in FIG. 1, 2, 3, 4, 5, or 6A) operatively connected to the connection part (e.g., the connection part 595 in FIG. 5 or 6A) and the at least one RF circuit (e.g., the second RF circuit 530 in FIG. 5, or the second RF circuit 640 in FIG. 6A).

According to an embodiment, the at least one processor (e.g., the processor 120 in FIG. 1, 2, 3, 4, 5, or 6A) may be configured to turn off the at least one PA based on a connection between the electronic device (e.g., the electronic device 101 in FIG. 1, 2, 3, 4, 5, or 6A) and an external electronic device (e.g., an electronic device 102, or an external electronic device 200 in FIG. 2, 3, 4, 5, or 6B).

According to an embodiment, the at least one processor (e.g., the processor 120 in FIG. 1, 2, 3, 4, 5, or 6A) may be further configured to convert, via the at least one RFIC (e.g., the second RFIC 510 in FIG. 4 or 5, or the second RFIC 610 in FIG. 6A), data for transmission to the external electronic device (e.g., the electronic device 102, or the external electronic device 200 in FIG. 2, 3, 4, 5, or 6B) into an RF signal.

According to an embodiment, the at least one processor (e.g., the processor 120 in FIG. 1, 2, 3, 4, 5, or 6A) may be further configured to direct the RF signal to the connection part (e.g., the connection part 595 in FIG. 5 or 6A) via the at least one divider (e.g., the divider 515 in FIG. 5, or the first divider 623 or the second divider 625 in FIG. 6A), and the RF signal may be directed to the external electronic device (e.g., the electronic device 102, or the external electronic device 200 in FIG. 2, 3, 4, 5, or 6B) via the connection part (e.g., the connection part 595 in FIG. 5 or 6A).

According to an embodiment, the electronic device (e.g., the electronic device 101 in FIG. 1, 2, 3, 4, 5, or 6A) may further include a connector 400 (e.g., a connector 400 in FIG. 4, 5, or 6A), and the at least one processor (e.g., the processor 120 in FIG. 1, 2, 3, 4, 5, or 6A) may be configured to receive, via the connector (e.g., the connector 400 in FIG. 4, 5, or 6A), a connection request from the external electronic device (e.g., the electronic device 102, or the external electronic device 200 in FIG. 2, 3, 4, 5, or 6B).

According to an embodiment, the at least one processor (e.g., the processor 120 in FIG. 1, 2, 3, 4, 5, or 6A) may be configured to set up the connection between the electronic device (e.g., the electronic device 101 in FIG. 1, 2, 3, 4, 5, or 6A) and the external electronic device (e.g., the electronic device 102, or the external electronic device 200 in FIG. 2, 3, 4, 5, or 6B) based on the connection request.

According to an embodiment, the at least one processor (e.g., the processor 120 in FIG. 1, 2, 3, 4, 5, or 6A) may be configured to execute a set application to set up the connection between the electronic device (e.g., the electronic device 101 in FIG. 1, 2, 3, 4, 5, or 6A) and the external electronic device (e.g., the electronic device 102, or the external electronic device 200 in FIG. 2, 3, 4, 5, or 6B).

According to an embodiment, the at least one RFIC (e.g., the second RFIC 510 in FIG. 4 or 5, or the second RFIC 610 in FIG. 6A) may include a Bluetooth circuit and a wireless fidelity (Wi-Fi) circuit, and the at least one processor may be configured to convert, via the Bluetooth circuit, a first baseband signal into a first RF signal based on a Bluetooth scheme, and convert, via the Wi-Fi circuit, a second baseband signal into a second RF signal based on a Wi-Fi scheme.

According to an embodiment, if the Bluetooth circuit supports a first frequency band and the Wi-Fi circuit supports the first frequency band and a second frequency band, the at least one divider (e.g., the divider 515 in FIG. 5, or the first divider 623 or the second divider 625 in FIG. 6A) may be disposed on at least one of a first path corresponding to the first frequency band of the Bluetooth circuit, a second path corresponding to the first frequency band of the Wi-Fi circuit, or a third path corresponding to the second frequency band of the Wi-Fi circuit.

According to an embodiment, the at least one RF circuit (e.g., the second RF circuit 530 in FIG. 5, or the second RF circuit 640 in FIG. 6A) may further include another PA.

According to an embodiment, the another PA may be disposed on a path other than the path on which the at least one divider (e.g., the divider 515 in FIG. 5, or the first divider 623 or the second divider 625 in FIG. 6A) is disposed.

According to an embodiment, the at least one processor (e.g., the processor 120 in FIG. 1, 2, 3, 4, 5, or 6A) may be further configured to release the connection between the electronic device (e.g., the electronic device 101 in FIG. 1, 2, 3, 4, 5, or 6A) and the external electronic device (e.g., the electronic device 102, or the external electronic device 200 in FIG. 2, 3, 4, 5, or 6B).

According to an embodiment, the at least one processor (e.g., the processor 120 in FIG. 1, 2, 3, 4, 5, or 6A) may be further configured to turn on the at least one PA based on the release of the connection.

According to an embodiment, the at least one processor (e.g., the processor 120 in FIG. 1, 2, 3, 4, 5, or 6A) may be configured to receive, via the connector (e.g., the connector 400 in FIG. 4, 5, or 6A), a connection release request from the external electronic device.

According to an embodiment, the electronic device (e.g., the electronic device 101 in FIG. 1, 2, 3, 4, 5, or 6A) may further include a connector 400 (e.g., a connector 400 in FIG. 4, 5, or 6A), and the at least one processor (e.g., the processor 120 in FIG. 1, 2, 3, 4, 5, or 6A) may be configured to release the connection between the electronic device (e.g., the electronic device 101 in FIG. 1, 2, 3, 4, 5, or 6A) and the external electronic device (e.g., the electronic device 102, or the external electronic device 200 in FIG. 2, 3, 4, 5, or 6B) based on the connection release request.

According to an embodiment, the at least one processor (e.g., the processor 120 in FIG. 1, 2, 3, 4, 5, or 6A) may be configured to execute a set application to release the connection between the electronic device (e.g., the electronic device 101 in FIG. 1, 2, 3, 4, 5, or 6A) and the external electronic device (e.g., the electronic device 102, or the external electronic device 200 in FIG. 2, 3, 4, 5, or 6B).

According to an embodiment, the at least one RF circuit (e.g., the second RF circuit 530 in FIG. 5, or the second RF circuit 640 in FIG. 6A) may further include at least one low noise amplifier (LNA).

According to an embodiment, an electronic device (e.g., an electronic device 102, or an external electronic device 200 in FIG. 2, 3, 4, 5, or 6B) may include a connection part (e.g., a connection part 590 in FIG. 5 or 6B), at least one radio frequency (RF) circuit (e.g., a second RF circuit 550 in FIG. 5 or 6B) for converting a baseband signal into an RF signal, and at least one processor (e.g., a processor 250 in FIG. 4, 5, or 6B) operatively connected to the connection part (e.g., the connection part 590 in FIG. 5 or 6B) and the at least one RF circuit (e.g., the second RF circuit 550 in FIG. 5 or 6B).

According to an embodiment, the at least one processor (e.g., the processor 250 in FIG. 4, 5, or 6B) may be configured to receive, via the connection part (e.g., the connection part 590 in FIG. 5 or 6B), a signal from an external electronic device (e.g., an electronic device 101 in FIG. 1, 2, 3, 4, 5, or 6A) based on a connection between the external electronic device (e.g., an electronic device 101 in FIG. 1, 2, 3, 4, 5, or 6A) and the electronic device (e.g., the electronic device 102, or the external electronic device 200 in FIG. 2, 3, 4, 5, or 6B).

According to an embodiment, the signal received from the external electronic device (e.g., the electronic device 101 in FIG. 1, 2, 3, 4, 5, or 6A) may be received via another connection part (e.g., a connection part 595 in FIG. 5 or 6A) connected to at least one divider (e.g., a divider 515 in FIG. 5, or a first divider 623 or a second divider 625 in FIG. 6A) included in at least one RF circuit (e.g., a second RF circuit 530 in FIG. 5 or second RF circuit 640 in FIG. 6A) of the external electronic device (e.g., the electronic device 101 in FIG. 1, 2, 3, 4, 5, or 6A).

According to an embodiment, the electronic device (e.g., the electronic device 102, or the external electronic device 200 in FIG. 2, 3, 4, 5, or 6B) may further include a connector (e.g., a connector 410 in FIG. 4, 5, or 6B), and the at least one processor (e.g., the processor 250 in FIG. 4, 5, or 6B) may be configured to transmit, via the connector (e.g., the connector 410 in FIG. 4, 5, or 6B), a connection request to the external electronic device (e.g., the electronic device 101 in FIG. 1, 2, 3, 4, 5, or 6A).

According to an embodiment, the at least one processor (e.g., the processor 250 in FIG. 4, 5, or 6B) may be configured to set up the connection between the electronic device (e.g., the electronic device 102, or the external electronic device 200 in FIG. 2, 3, 4, 5, or 6B) and the external electronic device (e.g., the electronic device 101 in FIG. 1, 2, 3, 4, 5, or 6A) based on the connection request.

According to an embodiment, the at least one processor (e.g., the processor 250 in FIG. 4, 5, or 6B) may be configured to execute a set application to set up the connection between the electronic device (e.g., the electronic device 102, or the external electronic device 200 in FIG. 2, 3, 4, 5, or 6B) and the external electronic device (e.g., the electronic device 101 in FIG. 1, 2, 3, 4, 5, or 6A).

According to an embodiment, the electronic device (e.g., the electronic device 102, or the external electronic device 200 in FIG. 2, 3, 4, 5, or 6B) may further include a connector (e.g., a connector 410 in FIG. 4, 5, or 6B), and the at least one processor (e.g., the processor 250 in FIG. 4, 5, or 6B) may be further configured to receive, via the connector (e.g., the connector 410 in FIG. 4, 5, or 6B), a connection release request from the external electronic device (e.g., the electronic device 101 in FIG. 1, 2, 3, 4, 5, or 6A).

According to an embodiment, the at least one processor (e.g., the processor 250 in FIG. 4, 5, or 6B) may be further configured to release the connection between the electronic device (e.g., the electronic device 102, or the external electronic device 200 in FIG. 2, 3, 4, 5, or 6B) and the external electronic device (e.g., the electronic device 101 in FIG. 1, 2, 3, 4, 5, or 6A) based on the connection release request.

According to an embodiment, the at least one processor (e.g., the processor 250 in FIG. 4, 5, or 6B) may be further configured to execute a set application to release the connection between the electronic device (e.g., the electronic device 102, or the external electronic device 200 in FIG. 2, 3, 4, 5, or 6B) and the external electronic device (e.g., the electronic device 101 in FIG. 1, 2, 3, 4, 5, or 6A).

Figure 7:
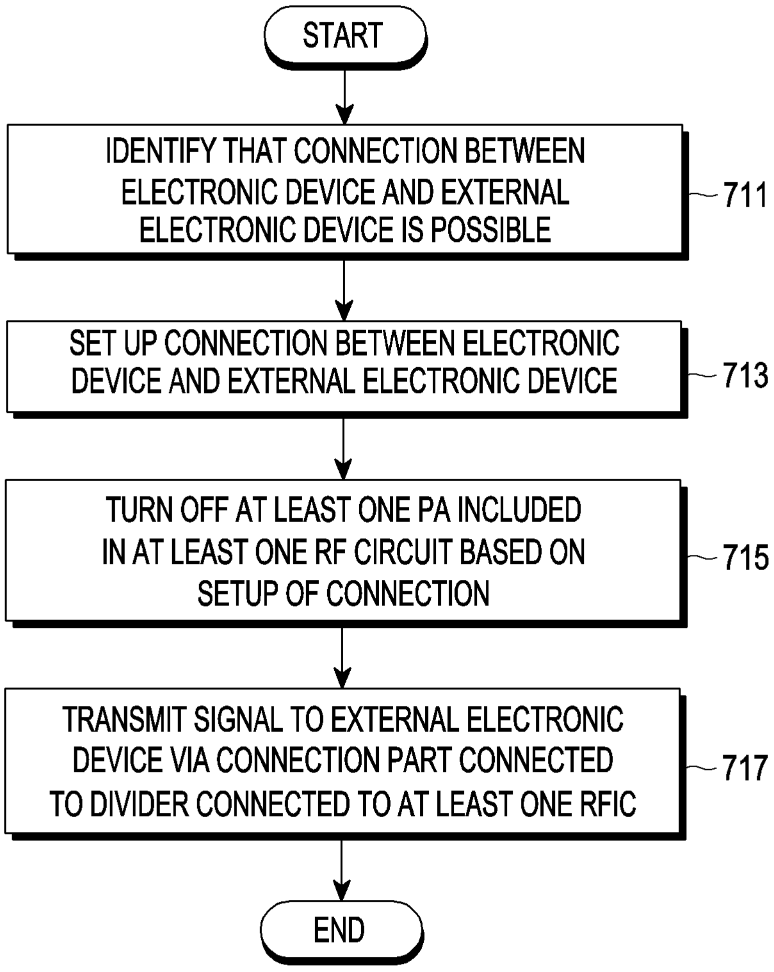
FIG. 7 is a flowchart illustrating an operating method of an electronic device according to an embodiment.

FIG. 7 is a flowchart illustrating an operating method of an electronic device according to an embodiment.

Referring to FIG. 7, an electronic device (e.g., an electronic device 101 in FIG. 1, 2, 3, 4, 5, or 6A)(e.g., a processor 120 in FIG. 1, 2, 3, 4, 5, or 6A)(e.g., a smart phone) may identify that a connection between an external electronic device (e.g., an electronic device 102 in FIG. 1, or an external electronic device 200 in FIG. 2, 3, 4, 5, or 6A)(e.g., a dongle) and the electronic device is possible in operation 711. In an embodiment, the electronic device may identify that the connection between the electronic device and the external electronic device is possible via at least one RFIC (e.g., a second RFIC 510 in FIG. 5 or a second RFIC 610 in FIG. 6A). In an embodiment, the electronic device may identify that the external electronic device is mounted on the electronic device via a connector (e.g., a connector 400 in FIG. 4, 5, or 6A). After identifying that the external electronic device is mounted on the electronic device, the electronic device may identify that the connection between the electronic device and the external electronic device is possible. According to an embodiment, the connector of the electronic device may be coupled to a connector (e.g., a connector 410 in FIG. 4, 5, or 6A) of the external electronic device. In an embodiment, the connector of the electronic device may include at least one socket, and the connector of the external electronic device may include at least one pin. In an embodiment, the connector of the electronic device may include at least one pin, and the connector of the external electronic device may include at least one socket. In operation 713, the connection between the electronic device and the external electronic device may be set up. According to an embodiment, the external electronic device may be registered with the electronic device based on access information (e.g., a password). According to an embodiment, the electronic device may set up the connection between the electronic device and the external electronic device based on a set application or a connection request received from the external electronic device. According to an embodiment, the connection between the electronic device and the external electronic device may include a Bluetooth connection (e.g., a Bluetooth connection of a 2.4 GHz band), and/or a Wi-Fi connection (e.g., a Wi-Fi connection of a 2.4 GHz band or a Wi-Fi connection of a 5 GHz band).

After setting up the connection between the electronic device and the external electronic device, the electronic device may turn off at least one PA included in at least one RF circuit (e.g., a second RF circuit 530 in FIG. 5 or a second RF circuit 640 in FIG. 6A) in operation 715. According to an embodiment, the at least one PA, which is turned off as the connection between the electronic device and the external electronic device is set up, may be electrically and/or operatively connected to at least one divider (e.g., a divider 515 in FIG. 5, or a first divider 623 or a second divider 625 in FIG. 6) included in the at least one RF circuit.

After turning off the at least one PA, the electronic device may convert, via at least one RFIC (e.g., a second RFIC 510 in FIG. 5 or a second RFIC 610 in FIG. 6A) included in the at least one RF circuit, data to be transmitted to the external electronic device into an RF signal, and divide, via at least one divider (e.g., a divider 515 in FIG. 5, a first divider 623 in FIG. 6A, or a second divider 625 in FIG. 6A, the RF signal to a connection part (e.g., a connection part 595 in FIG. 5 or 6A) to transfer the RF signal to the external electronic device via the connection part in operation 717.

According to an embodiment, as a connection between an electronic device and an external electronic device is set up, at least one PA is turned off and a signal transmitted from the electronic device to the external electronic device is transmitted to the external electronic device via at least one RF circuit in which a PA is turned off, so a security issue, which may be leaked to the outside through antenna radiation, may be reduced.

Figure 8:
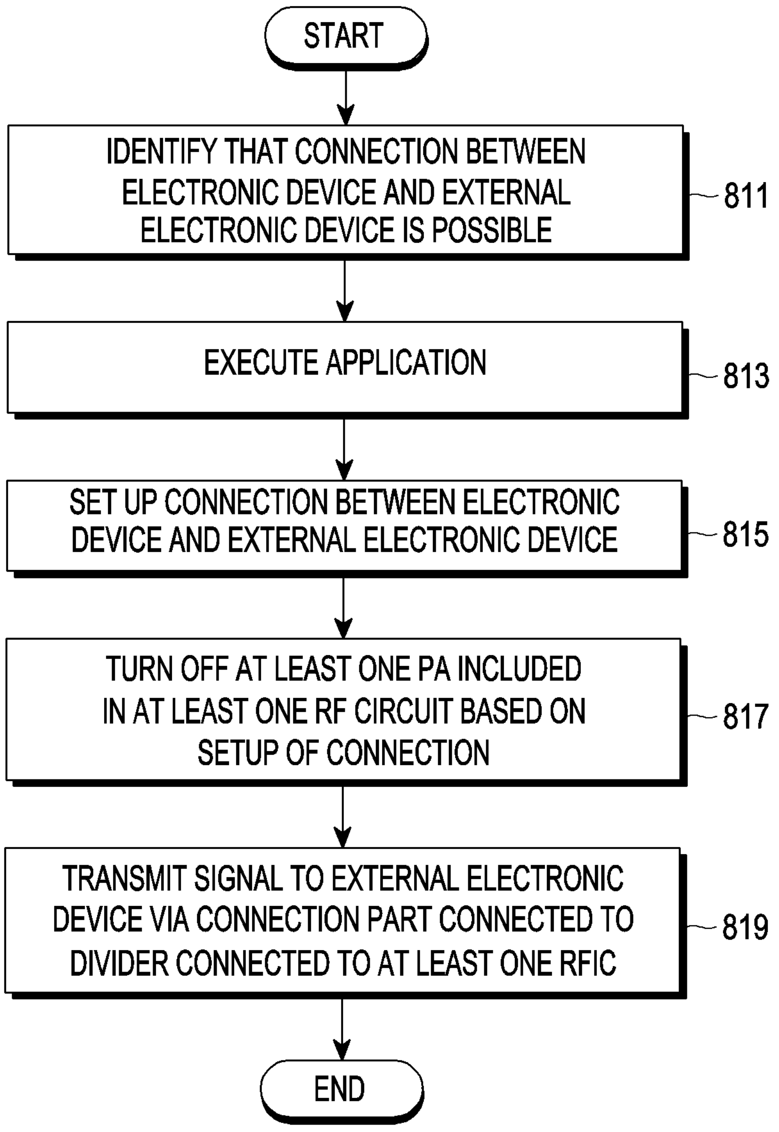
FIG. 8 is a flowchart illustrating an operating method of an electronic device according to an embodiment.

FIG. 8 is a flowchart illustrating an operating method of an electronic device according to an embodiment.

Referring to FIG. 8, an electronic device (e.g., an electronic device 101 in FIG. 1, 2, 3, 4, 5, or 6A)(e.g., a processor 120 in FIG. 1, 2, 3, 4, 5, or 6A)(e.g., a smart phone) may identify that a connection between an external electronic device (e.g., an electronic device 102 in FIG. 1, or an external electronic device 200 in FIG. 2, 3, 4, 5, or 6A)(e.g., a dongle) and the electronic device is possible in operation 811. In an embodiment, the electronic device may identify that the connection between the electronic device and the external electronic device is possible via at least one RFIC (e.g., a second RFIC 510 in FIG. 5 or a second RFIC 610 in FIG. 6A). In an embodiment, the electronic device may identify that the external electronic device is mounted on the electronic device via a connector (e.g., a connector 400 in FIG. 4, 5, or 6A). After identifying that the external electronic device is mounted on the electronic device, the electronic device may identify that the connection between the electronic device and the external electronic device is possible. Operation 811 may be implemented similarly to or substantially the same as operation 711 in FIG. 7, so a detailed description thereof will be omitted.

In operation 813, a set application may be executed. According to an embodiment, the set application may be an application for executing the external electronic device. According to an embodiment, the external electronic device may be registered with the electronic device based on access information (e.g., a password).

After executing the set application, the electronic device may set up the connection between the electronic device and the external electronic device in operation 815. According to an embodiment, the electronic device may transmit a connection request to the external electronic device through the set application and set up the connection between the electronic device and the external electronic device based on the connection request. According to an embodiment, the connection between the electronic device and the external electronic device may include a Bluetooth connection (e.g., a Bluetooth connection of a 2.4 GHz band), and/or a Wi-Fi connection (e.g., a Wi-Fi connection of a 2.4 GHz band or a Wi-Fi connection of a 5 GHz band).

After setting up the connection between the electronic device and the external electronic device, the electronic device may turn off at least one PA included in at least one RF circuit (e.g., a second RF circuit 530 in FIG. 5 or a second RF circuit 640 in FIG. 6A) in operation 817. According to an embodiment, the at least one PA, which is turned off as the connection between the electronic device and the external electronic device is set up, may be electrically and/or operatively connected to at least one divider (e.g., a divider 515 in FIG. 5, or a first divider 623 or a second divider 625 in FIG. 6) included in the at least one RF circuit.

After turning off the at least one PA, the electronic device may convert, via at least one RFIC (e.g., a second RFIC 510 in FIG. 5 or a second RFIC 610 in FIG. 6A) included in the at least one RF circuit, data to be transmitted to the external electronic device into an RF signal, and divide, via at least one divider (e.g., a divider 515 in FIG. 5, a first divider 623 in FIG. 6A, or a second divider 625 in FIG. 6A, the RF signal to a connection part (e.g., a connection part 595 in FIG. 5 or 6A) to transfer the RF signal to the external electronic device via the connection part in operation 819.

According to an embodiment, as a connection between an electronic device and an external electronic device is set up, at least one PA is turned off and a signal transmitted from the electronic device to the external electronic device is transmitted to the external electronic device via at least one RF circuit in which a PA is turned off, so a security issue, which may be leaked to the outside through antenna radiation, may be reduced.

Figure 9:
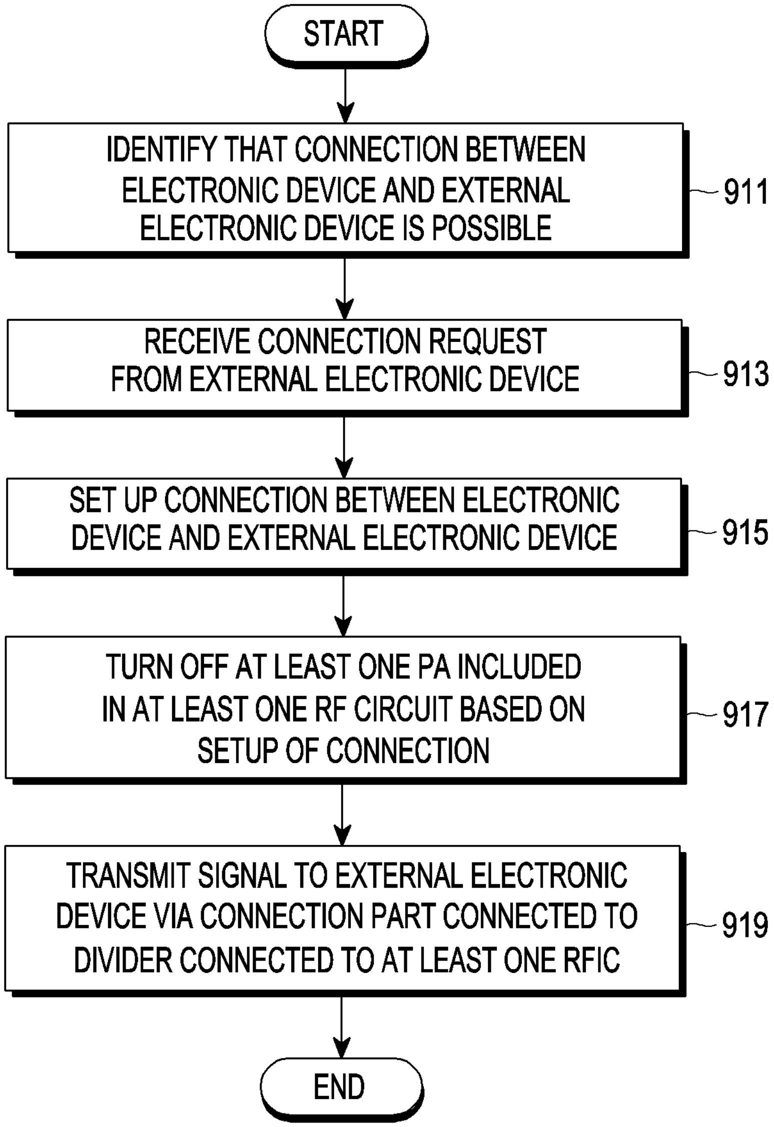
FIG. 9 is a flowchart illustrating an operating method of an electronic device according to an embodiment.

FIG. 9 is a flowchart illustrating an operating method of an electronic device according to an embodiment.

Referring to FIG. 9, an electronic device (e.g., an electronic device 101 in FIG. 1, 2, 3, 4, 5, or 6A)(e.g., a processor 120 in FIG. 1, 2, 3, 4, 5, or 6A)(e.g., a smart phone) may identify that a connection between an external electronic device (e.g., an electronic device 102 in FIG. 1, or an external electronic device 200 in FIG. 2, 3, 4, 5, or 6A)(e.g., a dongle) and the electronic device is possible in operation 911. In an embodiment, the electronic device may identify that the connection between the electronic device and the external electronic device is possible via at least one RFIC (e.g., a second RFIC 510 in FIG. 5 or a second RFIC 610 in FIG. 6A). In an embodiment, the electronic device may identify that the external electronic device is mounted on the electronic device via a connector (e.g., a connector 400 in FIG. 4, 5, or 6A). After identifying that the external electronic device is mounted on the electronic device, the electronic device may identify that the connection between the electronic device and the external electronic device is possible. Operation 911 may be implemented similarly to or substantially the same as operation 711 in FIG. 7, so a detailed description thereof will be omitted.

In operation 913, a connection request requesting the connection between the electronic device and the external electronic device may be received from the external electronic device. According to an embodiment, the external electronic device may be registered with the electronic device based on access information (e.g., a password).

After receiving the connection request from the external electronic device, the electronic device may set up the connection between the electronic device and the external electronic device in operation 915. According to an embodiment, the connection between the electronic device and the external electronic device may include a Bluetooth connection (e.g., a Bluetooth connection of a 2.4 GHz band), and/or a Wi-Fi connection (e.g., a Wi-Fi connection of a 2.4 GHz band or a Wi-Fi connection of a 5 GHz band).

After setting up the connection between the electronic device and the external electronic device, the electronic device may turn off at least one PA included in at least one RF circuit (e.g., a second RF circuit 530 in FIG. 5 or a second RF circuit 640 in FIG. 6A) in operation 917. According to an embodiment, the at least one PA, which is turned off as the connection between the electronic device and the external electronic device is set up, may be electrically and/or operatively connected to at least one divider (e.g., a divider 515 in FIG. 5, or a first divider 623 or a second divider 625 in FIG. 6) included in the at least one RF circuit.

After turning off the at least one PA, the electronic device may convert, via at least one RFIC (e.g., a second RFIC 510 in FIG. 5 or a second RFIC 610 in FIG. 6A) included in the at least one RF circuit, data to be transmitted to the external electronic device into an RF signal, and divide, via at least one divider (e.g., a divider 515 in FIG. 5, a first divider 623 in FIG. 6A, or a second divider 625 in FIG. 6A, the RF signal to a connection part (e.g., a connection part 595 in FIG. 5 or 6A) to transfer the RF signal to the external electronic device via the connection part in operation 919.

According to an embodiment, as a connection between an electronic device and an external electronic device is set up, at least one PA is turned off and a signal transmitted from the electronic device to the external electronic device is transmitted to the external electronic device via at least one RF circuit in which a PA is turned off, so a security issue, which may be leaked to the outside through antenna radiation, may be reduced.

According to an embodiment, an operating method of an electronic device (e.g., an electronic device 101 in FIG. 1, 2, 3, 4, 5, or 6A) may include turning off (715) at least one power amplifier (PA) which is included in at least one radio frequency (RF) circuit (e.g., a second RF circuit 530 in FIG. 5 or a second RF circuit 640 in FIG. 6A) and connected to at least one antenna (225; 227), based on a connection between an external electronic device (e.g., an electronic device 102 in FIG. 1, or an external electronic device 200 in FIG. 2, 3, 4, 5, or 6A) and the electronic device (e.g., the electronic device 101 in FIG. 1, 2, 3, 4, 5, or 6A).

According to an embodiment, the operating method may further include converting (717), via at least one radio frequency integrated circuit (RFIC) (e.g., a second RFIC 510 in FIG. 4 or 5, or a second RFIC 610 in FIG. 6A) included in the at least one RF circuit (e.g., the second RF circuit 530 in FIG. 5 or the second RF circuit 640 in FIG. 6A), data for transmission to the external electronic device (e.g., the electronic device 102 in FIG. 1, or the external electronic device 200 in FIG. 2, 3, 4, 5, or 6A) into an RF signal, and directing, via at least one divider (e.g., a divider 515 in FIG. 5, or a first divider 623 or a second divider 625 in FIG. 6A) connected to the at least one PA, the RF signal into a connection part (595) (e.g., a connection part 595 in FIG. 5 or FIG. 6A) connected to the at least one divider (e.g., the divider 515 in FIG. 5, or the first divider 623 or the second divider 625 in FIG. 6A) to direct the RF signal to the external electronic device (e.g., the electronic device 102 in FIG. 1, or the external electronic device 200 in FIG. 2, 3, 4, 5, or 6A).

According to an embodiment, setting up the connection between the electronic device (e.g., the electronic device 101 in FIG. 1, 2, 3, 4, 5, or 6A) and the external electronic device (e.g., the electronic device 102 in FIG. 1, or the external electronic device 200 in FIG. 2, 3, 4, 5, or 6A) may include receiving, via a connector (e.g., a connector 400 in FIG. 4, 5, or 6A), a connection request from the external electronic device (e.g., the electronic device 102 in FIG. 1, or the external electronic device 200 in FIG. 2, 3, 4, 5, or 6A).

According to an embodiment, setting up the connection between the electronic device (e.g., the electronic device 101 in FIG. 1, 2, 3, 4, 5, or 6A) and the external electronic device (e.g., the electronic device 102 in FIG. 1, or the external electronic device 200 in FIG. 2, 3, 4, 5, or 6A) may further include setting up the connection between the electronic device (e.g., the electronic device 101 in FIG. 1, 2, 3, 4, 5, or 6A) and the external electronic device (e.g., the electronic device 102 in FIG. 1, or the external electronic device 200 in FIG. 2, 3, 4, 5, or 6A) based on the connection request.

According to an embodiment, setting up the connection between the electronic device (e.g., the electronic device 101 in FIG. 1, 2, 3, 4, 5, or 6A) and the external electronic device (e.g., the electronic device 102 in FIG. 1, or the external electronic device 200 in FIG. 2, 3, 4, 5, or 6A) may further include executing set application to set up the connection between the electronic device (e.g., the electronic device 101 in FIG. 1, 2, 3, 4, 5, or 6A) and the external electronic device (e.g., the electronic device 102 in FIG. 1, or the external electronic device 200 in FIG. 2, 3, 4, 5, or 6A).

According to an embodiment, the operating method may further include releasing the connection between the electronic device (e.g., the electronic device 101 in FIG. 1, 2, 3, 4, 5, or 6A) and the external electronic device (e.g., the electronic device 102 in FIG. 1, or the external electronic device 200 in FIG. 2, 3, 4, 5, or 6A).

According to an embodiment, the operating method may further include turning on the at least one PA based on the release of the connection.

According to an embodiment, releasing the connection between the electronic device (e.g., the electronic device 101 in FIG. 1, 2, 3, 4, 5, or 6A) and the external electronic device (e.g., the electronic device 102 in FIG. 1, or the external electronic device 200 in FIG. 2, 3, 4, 5, or 6A) may include receiving, via a connector (e.g., a connector 400 in FIG. 4, 5, or 6A), a connection release request from the external electronic device (e.g., the electronic device 102 in FIG. 1, or the external electronic device 200 in FIG. 2, 3, 4, 5, or 6A), and releasing the connection between the electronic device (e.g., the electronic device 101 in FIG. 1, 2, 3, 4, 5, or 6A) and the external electronic device (e.g., the electronic device 102 in FIG. 1, or the external electronic device 200 in FIG. 2, 3, 4, 5, or 6A) based on the connection release request.

According to an embodiment, releasing the connection between the electronic device (e.g., the electronic device 101 in FIG. 1, 2, 3, 4, 5, or 6A) and the external electronic device (e.g., the electronic device 102 in FIG. 1, or the external electronic device 200 in FIG. 2, 3, 4, 5, or 6A) may include executing a set application to release the connection between the electronic device (e.g., the electronic device 101 in FIG. 1, 2, 3, 4, 5, or 6A) and the external electronic device (e.g., the electronic device 102 in FIG. 1, or the external electronic device 200 in FIG. 2, 3, 4, 5, or 6A).

The invention claimed is:

1. An electronic device, comprising:

at least one antenna;

at least one radio frequency (RF) circuit including at least one radio frequency integrated circuit (RFIC), at least one power amplifier (PA) connected to the at least one antenna, and at least one divider connected to the at least one RFIC and the at least one PA;

a connection part connected to the at least one divider and configured to provide a physical connection for direct coupling between the electronic device and an external electronic device;

at least one processor comprising processing circuitry; and memory storing instructions that, when executed by the at least one processor individually and/or collectively, cause the electronic device to:

turn off the at least one PA based on the external electronic device being physically connected to the electronic device via the connection part, convert, via the at least one RFIC, data for transmission to the external electronic device into an RF signal, and direct the RF signal to the connection part via the at least one divider, the RF signal being directed and communicated to the external electronic device via the connection part.

2. The electronic device of claim 1, wherein the connection part comprises a connector, wherein the instructions, when executed by the at least one processor individually and/or collectively, cause the electronic device to:

receive, via the connector, a connection request from the external electronic device, and set up the connection between the electronic device and the external electronic device based on the connection request.

3. The electronic device of claim 1, wherein the instructions, when executed by the at least one processor individually and/or collectively, cause the electronic device to:

execute a set application to set up the connection between the electronic device and the external electronic device.

4. The electronic device of claim 1, wherein the at least one RFIC comprises:

a Bluetooth circuit; and a wireless fidelity (Wi-Fi) circuit, wherein the instructions, when executed by the at least one processor individually and/or collectively, cause the electronic device to:

convert, via the Bluetooth circuit, a first baseband signal into a first RF signal based on a Bluetooth scheme, and convert, via the Wi-Fi circuit, a second baseband signal into a second RF signal based on a Wi-Fi scheme.

5. The electronic device of claim 4, wherein the Bluetooth circuit supports a first frequency band and the Wi-Fi circuit supports the first frequency band and a second frequency band, and wherein the at least one divider is disposed on at least one of a first path corresponding to the first frequency band of the Bluetooth circuit, a second path corresponding to the first frequency band of the Wi-Fi circuit, or a third path corresponding to the second frequency band of the Wi-Fi circuit.

6. The electronic device of claim 5, wherein the at least one RF circuit further comprises another PA, and wherein the another PA is disposed on a path other than the path on which the at least one divider is disposed.

7. The electronic device of claim 1, wherein the instructions, when executed by the at least one processor individually and/or collectively, cause the electronic device to:

release the connection between the electronic device and the external electronic device, and turn on the at least one PA based on the release of the connection.

8. The electronic device of claim 7, wherein the instructions, when executed by the at least one processor individually and/or collectively, cause the electronic device to:

execute a set application to release the connection between the electronic device and the external electronic device.

9. The electronic device of claim 1, wherein the connection part comprises a connector and wherein the instructions, when executed by the at least one processor individually and/or collectively, cause the electronic device to:

receive, via the connector, a connection release request from the external electronic device, and release the connection between the electronic device and the external electronic device based on the connection release request.

10. The electronic device of claim 1, wherein the at least one RF circuit further comprises at least one low noise amplifier (LNA).

11. An operating method of an electronic device, the operating method comprising:

turning off at least one power amplifier (PA) which is included in at least one radio frequency (RF) circuit and connected to at least one antenna, based on a connection between an external electronic device and the electronic device; and converting, via at least one radio frequency integrated circuit (RFIC) included in the at least one RF circuit, data for transmission to the external electronic device into an RF signal, and directing, via at least one divider connected to the at least one PA, the RF signal into a connection part connected to the at least one divider and configured to provide a physical connection for direct coupling between the electronic device and an external electronic device, wherein the RF signal is directed and communicated to the external electronic device via the connection part.

12. The operating method of claim 11, wherein the connection part comprises a connector and wherein setting up the connection between the electronic device and the external electronic device, the method further comprises:

receiving, via the connector, a connection request from the external electronic device; and setting up the connection between the electronic device and the external electronic device based on the connection request.

13. The operating method of claim 11, wherein setting up the connection between the electronic device and the external electronic device, the method further comprises:

executing set application to set up the connection between the electronic device and the external electronic device.

14. The operating method of claim 11, further comprising:

releasing the connection between the electronic device and the external electronic device; and turning on the at least one PA based on the release of the connection.

15. The operating method of claim 11, wherein the connection part comprises a connector and wherein releasing the connection between the electronic device and the external electronic device, the method further comprises:

receiving, via the connector, a connection release request from the external electronic device, and releasing the connection between the electronic device and the external electronic device based on the connection release request; or executing a set application to release the connection between the electronic device and the external electronic device.

* * * * *